(12) United States Patent
Lu

(10) Patent No.: US 12,356,467 B2
(45) Date of Patent: Jul. 8, 2025

(54) RANDOM ACCESS METHOD AND DEVICE AND COMMUNICATION SYSTEM

(71) Applicant: FUJITSU LIMITED, Kawasaki (JP)

(72) Inventor: Yang Lu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 465 days.

(21) Appl. No.: 17/511,637

(22) Filed: Oct. 27, 2021

(65) Prior Publication Data
US 2022/0053576 A1    Feb. 17, 2022

Related U.S. Application Data

(63) Continuation of application No. PCT/CN2019/085332, filed on Apr. 30, 2019.

(51) Int. Cl.
| | | |
|---|---|---|
| H04W 74/0833 | (2024.01) | |
| H04L 5/00 | (2006.01) | |
| H04W 56/00 | (2009.01) | |
| H04W 74/08 | (2009.01) | |

(52) U.S. Cl.
CPC ....... *H04W 74/0841* (2013.01); *H04L 5/0051* (2013.01); *H04W 56/001* (2013.01); *H04W 74/0866* (2013.01)

(58) Field of Classification Search
CPC ........... H04W 74/0841; H04W 56/001; H04W 74/0866; H04W 74/0833; H04W 56/0015; H04W 74/002; H04L 5/0051; H04L 5/005
See application file for complete search history.

(56) References Cited

U.S. PATENT DOCUMENTS

| | | | |
|---|---|---|---|
| 2012/0093106 A1 | 4/2012 | Dong | |
| 2014/0317456 A1 | 10/2014 | Kim et al. | |
| 2017/0303204 A1* | 10/2017 | Hu | H04W 52/325 |
| 2019/0207667 A1* | 7/2019 | Zhou | H04L 69/22 |
| 2019/0335515 A1 | 10/2019 | Chen et al. | |
| 2019/0357266 A1 | 11/2019 | Ren et al. | |
| 2020/0120713 A1* | 4/2020 | Yerramalli | H04L 5/0044 |
| 2020/0267768 A1* | 8/2020 | Hakola | H04L 5/0091 |
| 2020/0288408 A1* | 9/2020 | Su | H04W 52/48 |

(Continued)

FOREIGN PATENT DOCUMENTS

| | | |
|---|---|---|
| CN | 101980575 A | 2/2011 |
| CN | 108271275 A | 7/2018 |

(Continued)

OTHER PUBLICATIONS

Notice of Reasons for Refusal by the Japan Patent Office issued for corresponding Japanese Patent Application No. 2021-564407 mailed on Nov. 15, 2022.

(Continued)

*Primary Examiner* — Sudesh M Patidar
(74) *Attorney, Agent, or Firm* — Myers Wolin, LLC

(57) ABSTRACT

A random access method and device and a communication system. The device includes: a first controller configured to control a terminal equipment to initiate a 2-step random access procedure; and a second controller configured to control the terminal equipment to initiate a non-contention random access procedure or a 4-step random access procedure when the 2-step random access procedure is not completed. The first and second controller may be provided by control circuitry.

13 Claims, 9 Drawing Sheets

(56) References Cited

U.S. PATENT DOCUMENTS

| | | | |
|---|---|---|---|
| 2020/0296765 A1* | 9/2020 | Kim | H04W 56/0015 |
| 2020/0404711 A1 | 12/2020 | Zhao et al. | |
| 2022/0174749 A1* | 6/2022 | Ohara | H04W 74/0833 |
| 2023/0180305 A1* | 6/2023 | Kusashima | H04W 74/0833 370/329 |
| 2023/0189158 A1* | 6/2023 | Zhou | H04W 52/04 455/522 |

FOREIGN PATENT DOCUMENTS

| | | | |
|---|---|---|---|
| CN | 108282901 A | 7/2018 | |
| JP | 2015-506629 A | 3/2015 | |
| JP | 2020-528711 A | 9/2020 | |
| WO | 2018/127228 A1 | 7/2018 | |
| WO | 2018/151230 A1 | 8/2018 | |
| WO | WO-2018175809 A1 * | 9/2018 | H04W 36/0077 |
| WO | 2019/022572 A1 | 1/2019 | |

OTHER PUBLICATIONS

3GPP TS 38.321 V15.4.0, "3rd Generation Partnership Project; Technical Specification Group Radio Access Network; NR; Medium Access Control (MAC) protocol specification (Release 15)", Dec. 2018.

Zte et al., "On 2-Step RACH Procedures", Agenda Item: 7.2.1.2., 3GPP TSG RAN WG1 Meeting #96bis, R1-1903879, Xi'an, China, Apr. 8-12, 2019.

First Notification of Office Action and search report issued by the China National Intellectual Property Administration for corresponding Chinese Patent Application No. 201980095893.3, mailed on Jun. 29, 2023, with an English translation.

Notice of Reasons for Refusal issued by the Japan Patent Office for corresponding Japanese Patent Application No. 2021-564407, mailed on Feb. 20, 2024, with an English translation.

International Search Report and Written Opinion of the International Searching Authority issued by the China National Intellectual Property Administration for corresponding International Patent Application No. PCT/CN2019/085332, mailed on Jan. 31, 2020, with an English translation.

Decision of Refusal issued by the Japan Patent Office for corresponding Japanese Patent Application No. 2021-564407, mailed on May 9, 2023, with an English translation.

The Examination Report issued by the Indian Patent Office for corresponding Indian patent application No. 202137049048 and mailed on Mar. 30, 2022, with English translation.

Extended European Search Report with supplementary European search report and European search opinion issued by the European Patent Office for corresponding European Patent Application No. 19927513.2 mailed on Apr. 4, 2022.

Huawei et al., "RACH type switching between 2-steps, 4-steps RACH and CFRA", Agenda Item: 11.13, 3GPP TSG-RAN WG2 Meeting 105bis, R2-1904112, Xian, China, Apr. 8-12, 2019.

Catt, "Rach power control and power ramping procedure in multi-beam Configuration", Agenda Item: 6.1.1.4.3, 3GPP TSG RAN WG1 RAN1#90, R1-1712358, Prague, Czechia, Aug. 21-25, 2017.

Notice of Preliminary Rejection issued by the Korean Patent Office for corresponding Japanese Korean Patent Application No. 10-2021-7035215, mailed on Jul. 9, 2024, with an English translation.

Hearing Notice issued by the Indian Patent Office for corresponding Indian Patent Application No. 202137049048, mailed on Jan. 23, 2025, with an English translation.

* cited by examiner

RANDOM ACCESS METHOD AND DEVICE AND COMMUNICATION SYSTEM

CROSS-REFERENCE TO RELATED APPLICATION

This application is a continuation application of International Application PCT/CN2019/085332 filed on Apr. 30, 2019 and designated the U.S., the entire contents of which are incorporated herein by reference

TECHNICAL FIELD

This disclosure relates to the field of communications.

BACKGROUND

A random access procedure is a very critical step in mobile communication technologies.

FIG. 1(a) is a flowchart of an existing 4-step contention-based random access (CBRA) procedure. As shown in FIG. 1(a), in step 101, a terminal equipment selects a CBRA preamble, and transmits the preamble via Msg1 in a contention-based random access occasion (RO) pre-configured by the system; in step 102, the network device transmits msg2 after receiving the preamble; thus, a random access response (RAR) grants a dedicated uplink physical uplink shared channel (PUSCH) resource for the terminal equipment transmitting the preamble and allocates a temporary CRNTI to indicate uplink advance of the PUSCH; in step 103, the terminal equipment transmits Msg3 carrying signaling or data on the PUSCH resource; and in step 104, the network device transmits a contention resolution signaling Msg4 for Msg3 to the terminal equipment.

FIG. 1(b) is a flowchart of an existing 2-step contention-based random access (CBRA) procedure. As shown in FIG. 1(b), in step 105, the terminal equipment transmits Msg A, Msg A containing CBRA preamble and a payload, and the terminal equipment transmits the preamble of MsgA in the contention RO and transmits signaling or service data of MsgA in a contention physical uplink shared channel (PUSCH) resource; and in step 106, the network device transmits MsgB after receiving MsgA, thereby transmitting a random access response and a contention resolution message to the terminal equipment.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

The network device demodulates MsgA data via a demodulation reference signal (DMRS) transmitted on a physical uplink shared channel (PUSCH) resource of the MsgA data, a DMRS sequence being related to an index of a preamble of the MsgA transmitted by the terminal equipment, and the network device obtains a corresponding DMRS of the index of the preamble according to the preamble demodulated in a random access occasion (RO) resource.

If multiple terminal equipments select different preamble indices in 2-step CBRA and transmit MsgA data on identical PUSCH, the network device may demodulate the MsgA data according to the DMRS to which the preamble index corresponds.

It was found by the inventors of this disclosure that when a channel condition is poor or multiple terminal equipments use identical MsgA PUSCH resources, a probability of successfully demodulating PUSCHs at the network device side is reduced, and 2-step random access is likely to fail, and at this moment, transmission latency and transmission efficiency of a terminal equipment adopting 2-step random access will be worse than those of a terminal equipment adopting 4-step random access; and if 2-step random access fails, access to the network by the terminal equipment by adopting 2-step random access mode may fail again, thereby increasing the transmission latency.

In order to solve the above technical problems, embodiments of this disclosure provide a random access method and device and a communication system. In the random access method of the embodiment of this disclosure, the terminal equipment initiates a non-contention random access procedure or a 4-step random access procedure when a 2-step random access procedure is not completed. Thus, in case of failure of the 2-step random access procedure, a problem of increase of transmission latency may be avoided.

According to a first aspect of the embodiments of this disclosure, there is provided a random access device, applicable to a terminal equipment, the device including: a first controlling unit configured to control the terminal equipment to initiate a two-step random access procedure; and a second controlling unit configured to control the terminal equipment to initiate a non-contention random access procedure or a four-step random access procedure when the two-step random access procedure is not completed.

According to a second aspect of the embodiments of this disclosure, there is provided a random access device, applicable to a network device, the device including:

a third controlling unit configured to control the network device to transmit to a terminal equipment, non-contention random access configuration information of a non-contention random access procedure initiated by the terminal equipment when a two-step random access procedure is not completed, and/or, first indication used for indicating the terminal equipment to initiate a non-contention random access procedure when a two-step random access procedure is not completed; or a fourth controlling unit configured to control the network device to transmit to a terminal equipment, four-step random access configuration information of a four-step random access procedure initiated by the terminal equipment when a two-step random access procedure is not completed, and/or, second indication used for indicating the terminal equipment to initiate a four-step random access procedure when a two-step random access procedure is not completed.

According to a third aspect of the embodiments of this disclosure, there is provided a communication system, including a terminal equipment and a network device, the terminal equipment including the random access device as described in the first aspect of the embodiments, and the network device including the random access device as described in the second aspect of the embodiments.

An advantage of the embodiments of this disclosure exists in that the terminal equipment initiates a non-contention random access procedure or a 4-step random access procedure when a 2-step random access procedure is not completed. Thus, in case of failure of the 2-step random access procedure, a problem of increase of transmission latency may be avoided.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1A:
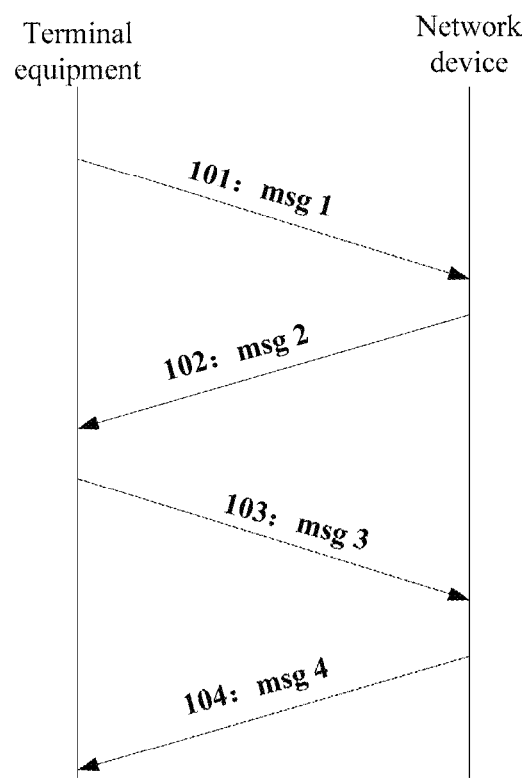
FIG. 1(a) is a flowchart of an existing 4-step contention-based random access (CBRA) procedure.
Figure 1B:
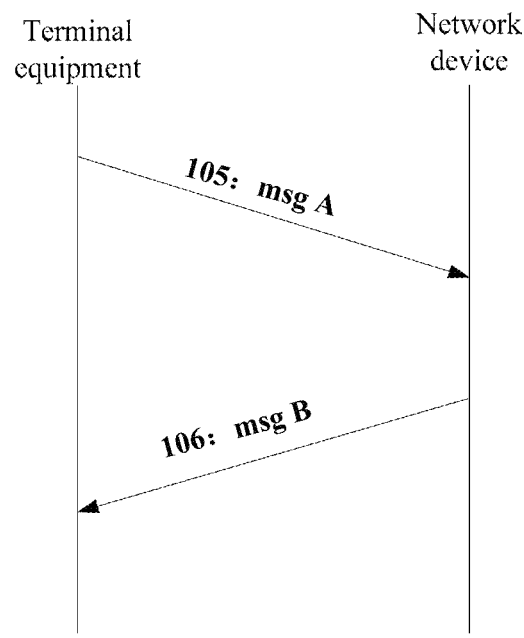
FIG. 1(b) is a flowchart of an existing 2-step contention-based random access (CBRA) procedure

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first," and "second," etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain," "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on," except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE)" refers to, for example, an equipment accessing to a communication network and receiving network services. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, this disclosure is not limited thereto.

Figure 2:
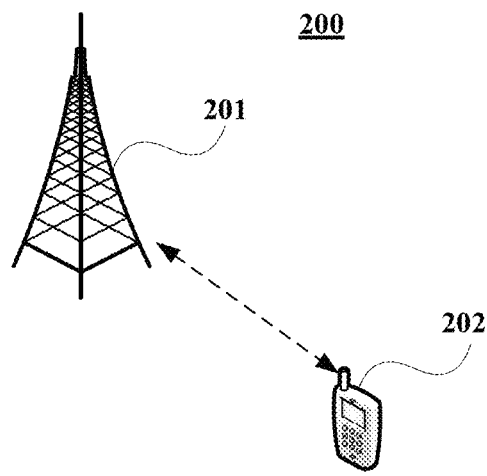
FIG. 2 is a schematic diagram of a communication system of this disclosure.

FIG. 2 is a schematic diagram of a communication system of an embodiment of this disclosure, in which a case where a terminal equipment and a network device are taken as examples is schematically shown. As shown in FIG. 2, a communication system 200 may include a network device 201 and a terminal equipment 202 (for the sake of simplicity, an example having only one terminal equipment is schematically given in FIG. 2).

In the embodiment of this disclosure, existing traffics or traffics that may be implemented in the future may be performed between the network device 201 and the terminal equipment 202. For example, such traffics may include but not limited to enhanced mobile broadband (eMBB), massive machine type communication (MTC), and ultra-reliable and low-latency communication (URLLC), etc.

The terminal equipment 202 may transmit data to the network device 201, for example, in a grant or grant-free transmission mode. The network equipment 201 may receive data transmitted by one or more terminal equipments 202, and feed back information, such as acknowledgement ACK/non-acknowledgement NACK, to the terminal equipment 202, and the terminal equipment 202 may acknowledge terminating a transmission process according to the feedback information, or may further perform new data transmission, or may perform data retransmission.

In addition, before the terminal equipment 202 accesses to the network device 201, the network device 201 may transmit information related to system information to the terminal equipment 202, and the terminal equipment 202 detects the received information so as to achieve downlink synchronization, and establishes connection with the network device 201.

Following description shall be given by taking that a network device in a communication system is a transmitter end or a receiver end and a terminal equipment is a receiver end or a transmitter end as an example; however, this disclosure is not limited thereto, and the transmitter end and/or receiver end may also be other devices. For example, this disclosure is not only applicable to signal transmission between a network device and a terminal equipment, but also applicable to signal transmission between two terminal equipments.

In the following embodiments of this disclosure, a four-step random access procedure refers to a 4-step contention-based random access (CBRA) procedure, which may also be written as a 4-step random access procedure, or a 4-step CBRA.

In the following embodiments of this disclosure, the two-step random access procedure refers to a 2-step contention-based random access (CBRA) procedure, which may also be written as a 2-step random access procedure, or 2-step CBRA.

Embodiment 1

Embodiment 1 of this disclosure provides a random access method, which may be executed by a terminal equipment.

Figure 3:
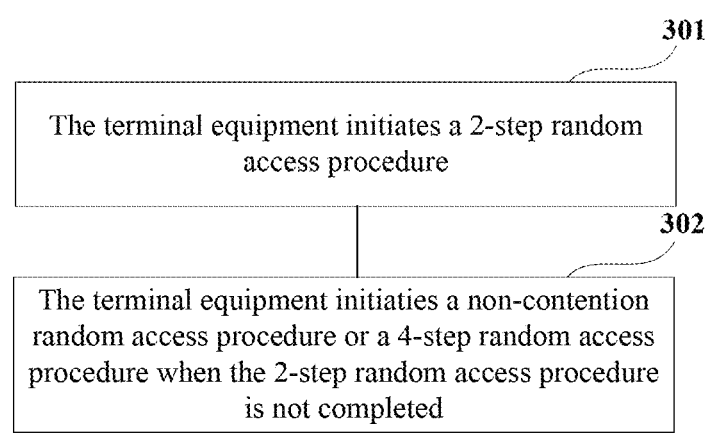
FIG. 3 is a schematic diagram of the random access method of Embodiment 1 of this disclosure.

FIG. 3 is a schematic diagram of the random access method of this embodiment. As shown in FIG. 3, the method includes:
step 301: the terminal equipment initiates a 2-step random access procedure; and
step 302: the terminal equipment initiates a non-contention random access procedure or a 4-step random access procedure when the 2-step random access procedure is not completed.

According to this embodiment, the terminal equipment initiates the non-contention random access procedure or the 4-step random access procedure when the 2-step random access procedure is not completed. Hence, when the 2-step random access procedure fails, efficiency of random access may be improved, and increase of transmission latency may be avoided.

In this embodiment, the 2-step random access procedure being not completed refers to at least one of the following cases:
case 1: no random access response is received in a random access response reception window after the terminal equipment transmits a first message of the 2-step random access procedure, wherein the first message may be MsgA;
for example, the terminal equipment does not receive random access response MsgB for contention resolution of 2-step random access within the random access response reception window, nor does not receive random access response of Msg3 for instructing the terminal equipment to transmit 4-step random access within the random access response reception window, wherein MsgB may carry contention resolution information, and the random access response of Msg3 for instructing the terminal equipment to transmit 4-step random access may carry an uplink resource grant for transmitting Msg3;

case 2: random access contention resolution in the 2-step random access procedure is not successful;

for example, the terminal equipment receives the random access response MsgB transmitted by the network device, but the contention resolution information contained in MsgB does not match information transmitted in MsgA, hence, the random access contention in the 2-step random access procedure cannot be successfully solved;

case 3: the number of times of transmitting 2-step random access preambles reaches a maximum threshold, wherein the number of times of transmitting 2-step random access preambles may be expressed by a parameter PREAMBLE_TRANSMISSION_COUNTER;

case 4: power for transmitting the 2-step random access preambles and/or power of a physical uplink shared channel (PUSCH) reach/reaches a maximum threshold, wherein the maximum threshold of power may be expressed by a parameter Pcmax;

for example, the power for transmitting preambles of MsgA of the 2-step random access reaches the maximum transmission threshold, or power for transmitting PUSCH of preambles of MsgA of the 2-step random access reaches the maximum transmission threshold, or a sum of power for transmitting preambles of MsgA of the 2-step random access and power for transmitting PUSCH of preambles of MsgA of the 2-step random access reaches the maximum transmission threshold.

In step 302 of this embodiment, when the 2-step random access procedure of step 301 is not completed, the terminal equipment may initiate the non-contention random access procedure or the 4-step random access procedure.

In the following different implementations, initiating the non-contention random access procedure and the 4-step random access procedure in step 302 shall be respectively described.

Implementation 1

In Implementation 1, when the 2-step random access procedure is not completed, the terminal equipment initiates the non-contention random access procedure.

Figure 4:
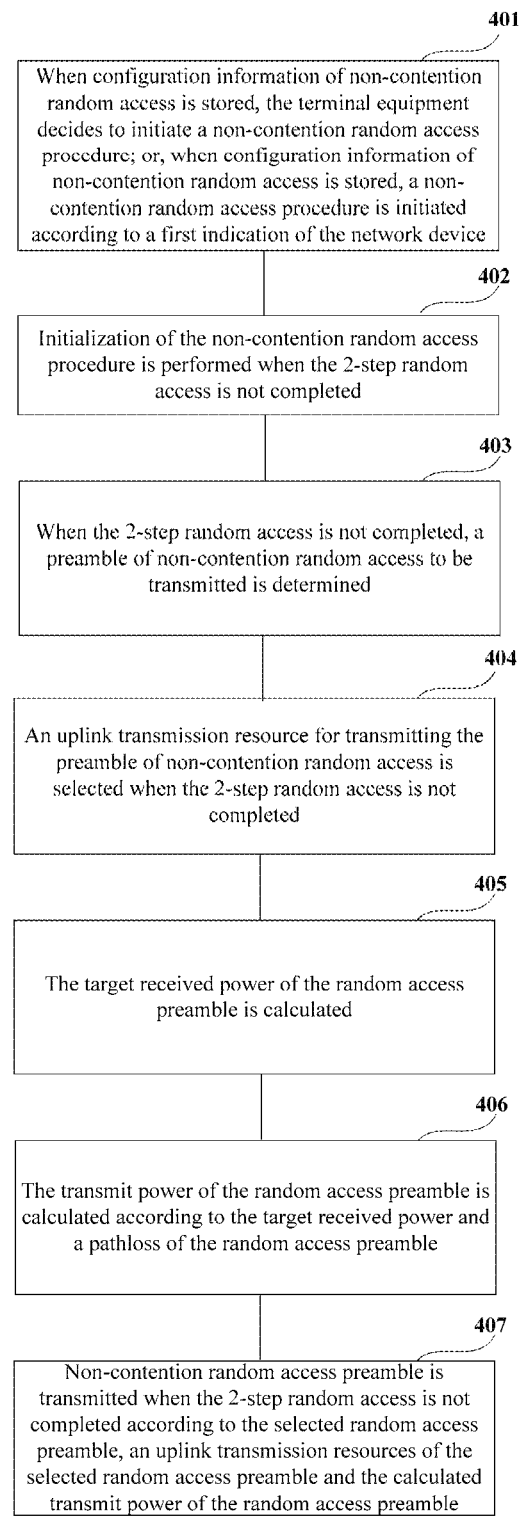
FIG. 4 is a schematic diagram of a method for initiating a non-contention random access procedure by a terminal equipment of Embodiment 1 of this disclosure.

FIG. 4 is a schematic diagram of a method for initiating a non-contention random access procedure by the terminal equipment. As shown in FIG. 4, the method includes:

step 401: when configuration information of non-contention random access is stored, the terminal equipment decides to initiate a non-contention random access procedure; or, when configuration information of non-contention random access is stored, a non-contention random access procedure is initiated according to a first indication of the network device.

In this embodiment, the terminal equipment may receive the configuration information of non-contention random access transmitted by the network device, and store the configuration information of non-contention random access.

In this embodiment, the configuration information of non-contention random access stored by the terminal equipment may at least include: configuration information of a candidate synchronization signal/physical broadcast channel block (SS/PBCH block, SSB) of the non-contention random access, and configuration information of a preamble corresponding to the candidate synchronization signal/physical broadcast channel block; or, configuration information of a candidate channel state information reference signal (CSI-RS) of the non-contention random access, and configuration information of a preamble to which the channel state information reference signal (CSI-RS) corresponds and configuration information of a transmission opportunity of the preamble.

In this embodiment, the terminal equipment may receive the configuration information of the non-contention random access via a radio resource control (RRC) message, and/or a physical downlink control channel (PDCCH) indication of a physical layer, and/or a random access response message of a media access control (MAC) layer.

In this embodiment, the RRC message carrying the configuration information of the non-contention random access may be a dedicated RRC message for the terminal equipment. The non-contention random access configuration information in the RRC message may include: a candidate synchronization signal/physical broadcast channel block (SS/PBCH Block, SSB) for non-contention random access, and configuration information of the preamble corresponding to the candidate SSB, or configuration information of the candidate channel state information reference signal (CSI-RS) of the non-contention random access, and configuration information of a preamble corresponding to the channel state information reference signal (CSI-RS) and configuration information of a transmission occasion of the preamble.

In addition, the configuration information of the non-contention random access in the RRC message may further include at least one piece of the following information: a total number of available contention and non-contention random access preambles, a physical random access channel (PRACH) root sequence index, a subcarrier spacing of a preamble, a measurement reference signal received power (RSRP) threshold of a synchronization reference signal (SS-RS) needed by the terminal equipment in selecting a predetermined non-contention random access candidate SSB, a measurement RSRP threshold of a CSI-RS needed by the terminal equipment in selecting a predetermined non-contention random access candidate CSI-RS, a set of transmission occasions for non-contention random access preambles, the number of preamble transmission occasions distributed in the frequency domain, a starting position of preamble transmission occasions in the frequency domain, a power ramping step factor of preambles, a maximum number of times of transmission of non-contention random access preambles, a length of a random access response reception window, and a target received power of preambles.

In this embodiment, the non-contention random access configuration information in the PDCCH indication or the MAC layer random access response message may include: a candidate synchronization signal/physical broadcast channel block (SS/PBCH block, SSB) of non-contention random access, and configuration information of a preamble corresponding to the candidate SSB; or, configuration information of a candidate channel state information reference signal (CSI-RS) of non-contention random access, and configuration information of a preamble corresponding to the channel state information reference signal (CSI-RS) and configuration information of transmission occasions of preambles.

In step 401, in a case where the terminal equipment stores the configuration information of non-contention random access, when the above 2-step random access procedure is not completed (such as when at least one of the above cases 1-4 occurs), a non-contention random access procedure may be initiated on its own, that is, the configuration information of non-contention random access stored by the terminal equipment is equivalent to implicitly instructing the terminal equipment to initiate a non-contention random access procedure.

For example, if the terminal equipment has received an RRC message containing the configuration information of non-contention random access transmitted by the network device, or/and, when the 2-step random access procedure is not completed, the terminal equipment receives MAC layer control information or a physical layer PDCCH indication containing the configuration information of non-contention random access, the terminal equipment may decide on its own to initiate a non-contention random access procedure. That the terminal equipment receives the MAC layer control information containing the configuration information of non-contention random access when the 2-step random access procedure is not completed may be, for example, that the terminal equipment receives a random access response containing the configuration information of non-contention random access in a random access response reception window after the terminal equipment transmits MsgA of the 2-step RACH.

In step 401, the terminal equipment may initiate a non-contention random access procedure according to a first indication of the network device in a case where the terminal equipment stores the configuration information of the non-contention random access.

The terminal equipment may receive the first indication via an RRC message and/or a physical downlink control channel (PDCCH) indication of the physical layer and/or a random access response message of a media access control (MAC) layer. The RRC message is a system broadcast message or a dedicated RRC message for the terminal equipment. The random access response message of the MAC layer may be a specific type of random access response message, that is, the network device transmits the specific type of random access response message as the first indication to the terminal equipment. The specific type of random access response message may be, for example, a random access response message not carrying contention resolution information and/or not carrying an uplink transmission grant.

In a particular example, the network device may transmit the random access response message not carrying contention resolution information and/or not carrying an uplink transmission grant to the terminal equipment to instruct the terminal equipment to initiate a non-contention random access procedure. The terminal equipment receives the random access response in the random access response reception window, and initiates a non-contention random access procedure.

As shown in FIG. 4, the method for initiating a non-contention random access procedure by the terminal equipment may further include:

step 402: initialization of the non-contention random access procedure is performed when the 2-step random access is not completed.

In step 402, the initialization may include: configuring non-contention random access parameters. For example, the non-contention random access parameters may be obtained from an RRC message and/or a PDCCH indication and/or an MAC layer random access response message. These parameters may be used for selection of the non-contention random access preambles and configuration of transmission resources and transmission power of the preambles.

In step 402 of this embodiment, the configured non-contention random access parameters include common parameters and dedicated parameters.

In this embodiment, the common parameters may include at least one of the following parameters:

a set of transmission occasions for non-contention random access preambles, for example, this parameter may be expressed as prach-ConfigurationIndex;

an initial target received power of the non-contention random access preambles, for example, this parameter may be expressed as preambleReceivedTargetPower;

a SS-RS measurement RSRP threshold needed by the terminal equipment in selecting a designated non-contention random access candidate SSB, for example, this parameter may be expressed as rsrp-ThresholdSSB;

a measurement RSRP threshold needed by the terminal equipment in selecting an uplink carrier in a normal uplink (NUL) and supplementary uplink (SUL) carriers, for example, this parameter may be expressed as rsrp-ThresholdSSB-SUL;

a power ramping step factor of the non-contention random access preambles, for example, this parameter may be expressed as powerRampingStep;

a maximum number of times of transmission of the non-contention random access preambles, for example, this parameter may be expressed as preambleTransMax; and a length of the non-contention random access response reception window, for example, this parameter may be expressed as ra-ResponseWindow.

In this embodiment, the dedicated parameters may include at least one of the following parameters:

a measurement RSRP threshold of a CSI-RS needed by the terminal equipment in selecting a designated non-contention random access candidate CSI-RS, for example, this parameter may be expressed as rsrp-ThresholdCSI-RS;

a set of transmission occasions of preambles related to a designated non-contention random access candidate SSB, for example, this parameter may be expressed as ra-ssb-OccasionMaskIndex; and a set of transmission occasions of preambles related to a designated non-contention random access candidate CSI-RS, for example, this parameter may be expressed as ra-OccasionList.

In step 402 of this embodiment, the above common parameters may be obtained from the stored configuration information of non-contention random access described in step 401, or may be obtained from parameters reused with original non-contention random access parameters. For example, some of the common parameters are obtained from the configuration information of non-contention random access, and the other part of the common parameters are obtained from the parameters reused with original non-contention random access parameters; or, all the common parameters are obtained from the configuration information of non-contention random access parameters; or, all the common parameters are obtained from random access; or, all common parameters are obtained from the parameters reused with original non-contention random access parameters.

In step 402 of this implementation, the above dedicated parameters may be obtained from the stored configuration information of non-contention random access described in step 401.

As shown in FIG. 4, the method for initiating a non-contention random access procedure by the terminal equipment may further include:

step 403: when the 2-step random access is not completed, a preamble of non-contention random access to be transmitted is determined.

In this implementation, the preamble of non-contention random access may be determined according to the synchronization signal/physical broadcast channel block (SSB), or the preamble of non-contention random access may be determined according to a channel state information reference signal (CSI-RS).

Figure 5:
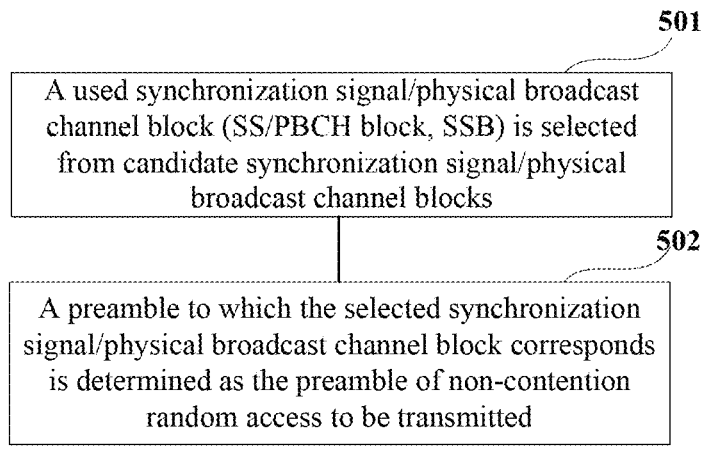
FIG. 5 is a schematic diagram of a method for determining a preamble of non-contention random access according to an SSB of Embodiment 1 of this disclosure.

FIG. 5 is a schematic diagram of a method for determining the preamble of non-contention random access according to an SSB. As shown in FIG. 5, the method includes:

step 501: a used synchronization signal/physical broadcast channel block (SS/PBCH block, SSB) is selected from candidate synchronization signal/physical broadcast channel blocks (SS/PBCH blocks, SSBs); and step 502: a preamble to which the selected synchronization signal/physical broadcast channel block (SS/PBCH Block, SSB) corresponds is determined as the preamble of non-contention random access to be transmitted.

In this implementation, the candidate synchronization signal/physical broadcast channel block (SS/PBCH Block, SSB) and the configuration information of the preamble to which the candidate SSB corresponds may be included in the configuration information of non-contention random access described in step 401. The configuration information of non-contention random access may come from an RRC message, and/or a PDCCH indication, and/or an MAC layer random access response message.

In step 501, the terminal equipment may measure received power of synchronization reference signal (SS-RS) of the candidate synchronization signal/physical broadcast channel block (SS/PBCH Block, SSB) in the configuration information of non-contention random access, and select the used SSB from the candidate SSBs according to the measured received power of synchronization reference signal (SS-RS). For example, the terminal equipment selects an SSB with a received power of synchronization reference signal (SS-RS) higher than a first preconfigured threshold (for example, denoted as rsrp-ThresholdSSB) from the candidate SSBs as the used SSB.

In step 502, the preamble corresponding to the selected used SSB is determined according to the used SSB selected in step 501 and configuration information of preambles to which the candidate SSBs correspond.

Figure 6:
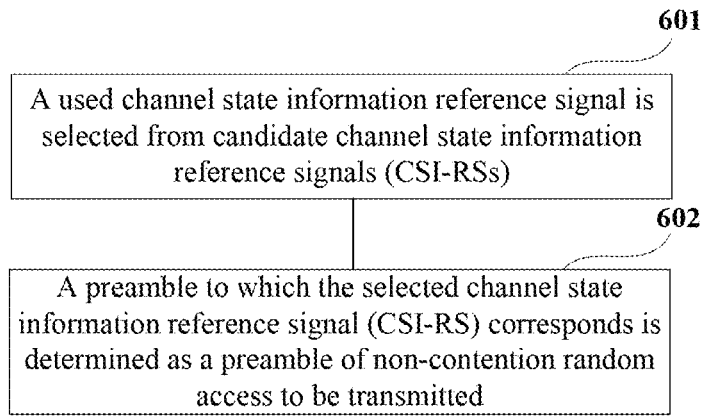
FIG. 6 is a schematic diagram of a method for determining a preamble of non-contention random access according to a CSI-RS of Embodiment 1 of this disclosure.

FIG. 6 is a schematic diagram of a method for determining the preamble of non-contention random access according to a CSI-RS. As shown in FIG. 6, the method includes:

step 601: a used channel state information reference signal is selected from candidate channel state information reference signals (CSI-RSs); and step 602: a preamble to which the selected channel state information reference signal (CSI-RS) corresponds is determined as a preamble of non-contention random access to be transmitted.

In this implementation, the candidate channel state information reference signal (CSI-RS) and the configuration information of the preamble to which the candidate channel state information reference signal (CSI-RS) corresponds may be included in the configuration information of non-contention random access described in step 401. The configuration information of non-contention random access may come from an RRC message, and/or a PDCCH indication, and/or an MAC layer random access response message.

In step 601, the terminal equipment may measure the received power of the candidate channel state information reference signals (CSI-RSs) in the configuration information of non-contention random access, and select the used CSI-RS from the candidate CSI-RSs according to the measured receive power of the channel state information reference signals (CSI-RSs). For example, the terminal equipment selects a CSI-RS with CSI-RS received power higher than a second preconfigured threshold (for example, denoted as rsrp-ThresholdCSI-RS) from the candidate CSI-RSs as the used CSI-RS.

In step 602, the preamble corresponding to the selected used CSI-RS is determined according to the used CSI-RS selected in step 601 and the configuration information of the preamble to which the candidate CSI-RSs correspond.

As shown in FIG. 4, the method for initiating a non-contention random access procedure by the terminal equipment may further include:

step 404: an uplink transmission resource for transmitting the preamble of non-contention random access is selected when the 2-step random access is not completed.

In step 404 of this embodiment, the terminal equipment may select a physical random access channel (PRACH) occasion for transmitting the preamble of non-contention random access according to the synchronization signal/physical broadcast channel block (SS/PBCH block, SSB) selected from the non-contention random access candidate synchronization signal/physical broadcast channel blocks (SS/PBCH blocks, SSBs) in step 501 or the channel state information reference signal (CSI-RS) selected from the candidate non-contention random access channel state information reference signals (CSI-RSs) in step 601.

For example, if an SSB is selected (such as in step 501), the terminal equipment may select a next available physical random access channel (PRACH) transmission occasion from a permitted set of preamble transmission occasions identified by a physical random access channel (PRACH) transmission occasion configuration parameter (such as a parameter ra-ssb-OccasionMaskIndex) to which the SSB in the configuration information of non-contention random access corresponds.

For another example, if a CSI-RS is selected (such as in step 601), the terminal equipment may select a next available physical random access channel (PRACH) transmission occasion from a permitted preamble transmission occasion identified by a physical random access channel (PRACH) transmission occasion configuration parameter (such as a parameter ra-ssb-OccasionList) to which the CSI-RS in the configuration information of non-contention random access corresponds.

Figure 7:
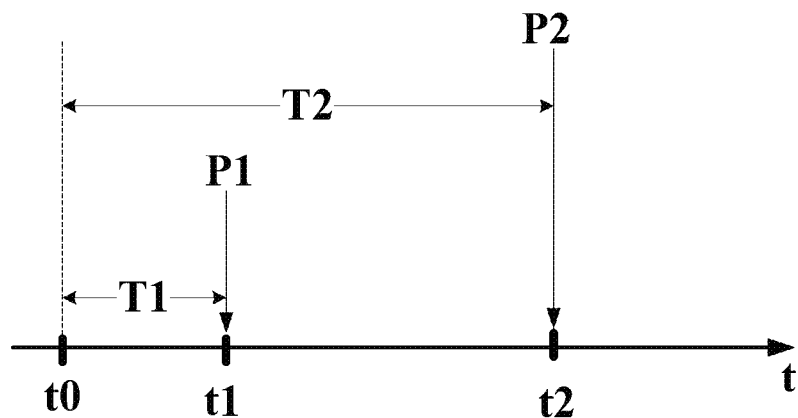
FIG. 7 is a schematic diagram of a next available physical random access channel transmission occasion of Embodiment 1 of this disclosure.

FIG. 7 is a schematic diagram of the next available physical random access channel (PRACH) transmission occasion of this embodiment. As shown in FIG. 7, a current time is t0, the next permitted PRACH transmission occasion is P1, and a further next permitted PRACH transmission occasion is P2, a time to which PRACH transmission occasion P1 corresponds is t1, and a time to which PRACH transmission occasion P2 corresponds is t2. A length of time between time t0 and time t1 is T1, and a length of time between time t0 and time t2 is T2.

Assuming that s time length for the terminal equipment to prepare for transmitting the preamble of non-contention random access is T0, if T0≤T1, PRACH transmission occasion P1 is the next available PRACH transmission occasion; if T0>T1, PRACH transmission occasion P1 is an unavailable PRACH transmission occasion, and if T0≤T2, PRACH transmission occasion P2 is the next available PRACH transmission occasion.

As shown in FIG. 4, the method for initiating a non-contention random access procedure by the terminal equipment may further include:

step 405: the target received power of the random access preamble is calculated; and step 406: the transmit power of the random access preamble is calculated according to the target received power and a pathloss of the random access preamble.

In step 405 of this embodiment, the target received power of the random access preamble may be calculated by using multiple methods.

In a method, the target received power of the random access preamble may be calculated according to an initial target received power parameter preambleReceivedTargetPower of the random access preamble, a first target received power offset value DELTA_PREAMBLE, a power ramping counting value of the random access preamble (PREAMBLE_POWER_RAMPING_COUNTER) and a power ramping step factor of the random access preamble (PREAMBLE_POWER_RAMPING_STEP).

In this method, for example, the target received power of the random access preamble may be calculated by using formula (1) below:

$$\text{Random access preamble target received power} = \text{preambleReceivedTargetPower} + \text{DELTA\_PREAMBLE} + (\text{PREAMBLE\_POWER\_RAMPING\_COUNTER} - 1) \times \text{PREAMBLE\_POWER\_RAMPING\_STEP} \quad (1);$$

where, the power ramping step factor of the random access preamble PREAMBLE_POWER_RAMPING_STEP and the initial target received power parameter of the random access preamble preambleReceivedTargetPower are parameters obtained from the configuration information of non-contention random access, and the first target received power offset value DELTA_PREAMBLE is a preset parameter related to a preamble format and a subcarrier spacing for transmitting the preamble.

In another method, the target received power of the random access preamble may be calculated according to the initial target received power parameter preambleReceivedTargetPower of the random access preamble, the first target received power offset value DELTA_PREAMBLE, the power ramping counting value of the random access preamble (PREAMBLE_POWER_RAMPING_COUNTER), the power ramping step factor of the random access preamble (PREAMBLE_POWER_RAMPING_STEP) and a second target received power offset value delta_fallback_TargetPower.

In this method, for example, the target received power of the random access preamble may be calculated by using formula (2) below:

$$\text{Random access target received power} = \text{preambleReceivedTargetPower} + \text{DELTA\_PREAMBLE} + (\text{PREAMBLE\_POWER\_RAMPING\_COUNTER} - 1) \times \text{PREAMBLE\_POWER\_RAMPING\_STEP} + \text{delta\_fallback\_TargetPower} \quad (2).$$

In this method, the second target received power offset value delta_fallback_TargetPower is a value greater than zero. Thus, the target received power is higher than that of ordinary random access, so that a priority of the non-contention random access procedure is higher than that of an ordinary random access procedure.

In this method, the second target received power offset value delta_fallback_TargetPower is a preset fixed value, or it is related to a ramping amplitude of target received power of the preamble of the uncompleted 2-step random access.

For example, the second target received power offset value delta_fallback_TargetPower is linearly related to the ramping amplitude of the target received power of the preamble of the uncompleted 2-step random access.

In a particular example, delta_fallback_TargetPower may be calculated by using formula (3) below:

$$\text{delta\_fallback\_TargetPower} = \beta \times (\text{PREAMBLE\_POWER\_RAMPING\_COUNTER}' - 1) \times \text{PREAMBLE\_POWER\_RAMPING\_STEP}' \quad (3);$$

where, $\beta$ is a linear correlation factor, PREAMBLE_POWER_RAMPING_COUNTER' is a power ramping count of the uncompleted 2-step random access, and PREAMBLE_POWER_RAMPING_STEP' is the target received power ramping step of the 2-step random access.

In a further method, the target received power of the random access preamble may be calculated according to the initial target received power parameter preambleReceivedTargetPower of the random access preamble, the first target received power offset value DELTA_PREAMBLE, the power ramping counting value of the random access preamble (PREAMBLE_POWER_RAMPING_COUNTER), the power ramping step factor of the random access preamble (PREAMBLE_POWER_RAMPING_STEP) and the target received power ramping step offset value delta_fallback_step.

In this method, for example, the target received power of the random access preamble may be calculated by using formula (4) below:

$$\text{Random access preamble target received power} = \text{preambleReceivedTargetPower} + \text{DELTA\_PREAMBLE} + (\text{PREAMBLE\_POWER\_RAMPING\_COUNTER} - 1) \times (\text{PREAMBLE\_POWER\_RAMPING\_STEP} + \text{delta\_fallback\_step}) \quad (4).$$

In this method, the target received power ramping step offset value delta_fallback_step is a value greater than zero. Thus, the target received power ramps faster than that of an ordinary random access, so that a priority of the non-contention random access procedure may be higher than a priority of an ordinary random access procedure.

In the above formulae (1), (2) and (4), the power ramping count value of the random access preamble (PREAMBLE_POWER_RAMPING_COUNTER) is used to record the number of times of preamble transmit power ramping, and 1 is added to each time of transmitting the non-contention random access preamble, therefore, each time of transmitting the preamble when the terminal equipment has not completed random access, the target received power of the preamble is increased by a step.

In this implementation, an initial value of the power ramping count value of the random access preamble (PREAMBLE_POWER_RAMPING_COUNTER) may be equal to:

a preset initial value, that is, when the terminal equipment initiates a non-contention random access procedure, the initial value of the power ramping count value of the random access preamble (PREAMBLE_POWER_RAMPING_COUNTER) is the preset initial value, the preset initial value being, for example, 1; or, the preamble power ramping count value of the uncompleted 2-step random access, that is, when the terminal equipment initiates a non-contention random access procedure, the initial value of the power ramping count value of the random access preamble (PREAMBLE_POWER_RAMPING_COUNTER) is equal to a current value of the power ramping count of the preamble of the uncompleted 2-step random access.

In step 406 of this embodiment, reference may be made to the relevant art for a particular method for calculating the transmit power of the random access preamble, which shall not be described in this embodiment any further.

As shown in FIG. 4, the method for initiating a non-contention random access procedure by the terminal equipment may further include:

step 407: non-contention random access preamble is transmitted when the 2-step random access is not completed according to the selected random access preamble, an uplink transmission resources of the selected random access preamble and the calculated transmit power of the random access preamble.

According to above steps 401-407, when the 2-step random access procedure is not completed, the terminal equipment initiates a non-contention random access procedure.

Implementation 2

In Implementation 2, when the 2-step random access procedure is not completed, the terminal equipment initiates a 4-step random access procedure.

Figure 8:
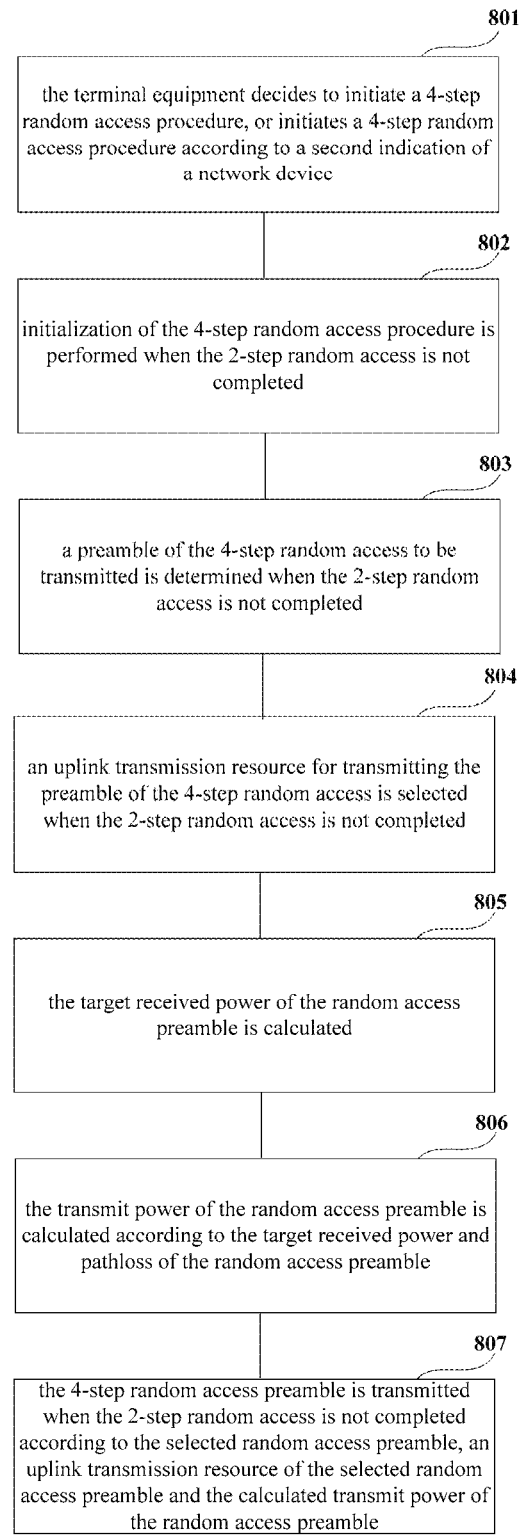
FIG. 8 is a schematic diagram of a method for initiating a 4-step random access procedure by a terminal equipment of Embodiment 1 of this disclosure.

FIG. 8 is a schematic diagram of a method for initiating a 4-step random access procedure by a terminal equipment. As shown in FIG. 8, the method includes:

step 801: the terminal equipment decides to initiate a 4-step random access procedure, or initiates a 4-step random access procedure according to a second indication of a network device.

In step 801, when the 2-step random access procedure is not completed (for example, when at least one of the above cases 1-4 occurs), the terminal equipment may decide to initiate the 4-step random access procedure on its own.

In step 801, the terminal equipment may also initiate the 4-step random access procedure according to the second indication of the network device.

The terminal equipment may receive the second indication via a radio resource control (RRC) message and/or a random access response message of a media access control (MAC) layer. The random access response message of the MAC layer may be a specific type of random access response message, that is, the network device transmits the specific type of random access response message as the second indication to the terminal equipment. The specific type of random access response message may be, for example, a random access response message not carrying contention resolution information and/or not carrying an uplink transmission grant. The RRC message may be a system broadcast message or dedicated RRC signaling.

For example, the second indication may be payload indication information of a random access channel transmitted by the network device, and the terminal equipment may decide to initiate the 4-step random access procedure according to the payload indication information of the random access channel. That is, the network device may detect a preamble transmission occasion of the 2-step random access and/or a collision rate or a payload condition in a PUSCH transmission occasion, or it may further detect a collision rate or a payload condition in the preamble transmission occasion of the 4-step random access, and take the payload indication information of the random access channel as the second indication are transmit to the terminal equipment.

In a case where the above second indication is the payload indication information of the random access channel, the payload indication information may be a payload factor from 0 to 1.

In a method, the smaller the payload factor identifies that the 2-step random access channel is more idle. After receiving the second indication, the terminal generates a random number between 0 and 1 at a uniformly distributed probability. If the random number is greater than the payload factor, the terminal equipment initiates the 4-step random access procedure; otherwise, the terminal equipment continues to initiate the 2-step random access procedure.

In another method, the smaller the payload factor identifies that the collision rate and payload of the 2-step random access channel are higher. After receiving the second indication, the terminal generates a random number between 0 and 1 at a uniformly distributed probability. If the random number is less than the payload factor, the terminal equipment initiates the 4-step random access procedure; otherwise, the terminal equipment continues to initiate the 2-step random access procedure.

In a particular example, if the terminal equipment has received an RRC message instructing the terminal equipment to initiate a 4-step random access procedure transmitted by the network device (for example, the RRC message may contain the above payload indication information of the random access channel), or/and, when the terminal equipment receives MAC layer control information instructing the terminal equipment to initiate the 4-step random access procedure when the 2-step random access procedure is not completed, the terminal equipment may decide to initiate a contention-based 4-step random access procedure. That the terminal equipment receives the MAC layer control information instructing the terminal equipment to initiate the 4-step random access procedure when the 2-step random access procedure is not completed may be, for example, that the terminal equipment receives the random access response message not carrying contention resolution information and/or not carrying an uplink transmission grant in the random access response reception window after the terminal equipment MsgA of the 2-step RACH. The RRC message received by the terminal equipment instructing the terminal equipment to initiate the contention-based 4-step random access procedure may be system broadcast information or dedicated RRC signaling.

As shown in FIG. 8, the method for initiating a 4-step random access procedure by the terminal equipment may further include:

step 802: initialization of the 4-step random access procedure is performed when the 2-step random access is not completed.

In step 802, the initialization may include: configuring 4-step random access parameters. For example, the 4-step random access parameters are obtained from configuration information of the 4-step random access, and these parameters may be used for selection of preambles of the 4-step random access and configuration of transmission resources and transmission power of the preambles.

In step 802, the configured 4-step random access parameters may include at least one of the following parameters:
 a set of transmission occasions for preambles of the 4-step random access, for example, this parameter may be expressed as a parameter prach-ConfigurationIndex;
 an initial target received power of preambles of the 4-step random access, for example, this parameter may be expressed as a preambleReceivedTargetPower;

a measurement RSRP threshold needed by the terminal equipment in selecting an uplink carrier in a normal uplink (NUL) and supplementary uplink (SUL) carriers, for example, this parameter may be expressed as rsrp-ThresholdSSB-SUL;

a power ramping step factor of the 4-step random access preambles, for example, this parameter may be expressed as powerRampingStep;

a maximum number of times of transmission of the preambles, for example, this parameter may be expressed as a parameter preambleTransMax;

an SS-RS measurement RSRP threshold needed in selecting an SSB in the 4-step random access, for example, this parameter may be expressed as a parameter rsrp-ThresholdSSB;

the number of SSBs sharing the same PRACH occasion and the number of contention random access preambles used by each SSB in the same PRACH occasion, for example, this parameter may be expressed as a parameter ssb-perRACH-OccasionAndCB-PreamblesPerSSB;

the number of preambles in a preamble group A used by each SSB, for example, this parameter may be expressed as a parameter numberOfRA-PreamblesGroupA;

a PDU size threshold for the terminal equipment to select msg3 of the preamble group A, for example, this parameter may be expressed as a parameter ra-Msg3 SizeGroupA (per cell);

a 4-step random access contention random access response reception window length, for example, this parameter may be expressed as a parameter ra-ResponseWindow;

a 4-step random access contention resolution information reception window length, for example, this parameter may be expressed as a parameter ra-ContentionResolutionTimer;

a target received power offset for the terminal equipment to select a preamble group B, for example, this parameter may be expressed as a parameter messagePowerOffsetGroupB; and a target received power offset of msg3, for example, this parameter may be expressed as a parameter msg3-DeltaPreamble.

In step 802 of this implementation, the above configured 4-step random access parameters may be obtained from the received configuration information of the 4-step random access, and/or may be obtained from parameters reused with original contention random access parameters. The terminal equipment may receive the configuration information of the 4-step random access via system broadcast information, and the original contention random access is, for example, original 4-step random access.

As shown in FIG. 8, the method for initiating a 4-step random access procedure by the terminal equipment may further include:

step 803: a preamble of the 4-step random access to be transmitted is determined when the 2-step random access is not completed.

In this implementation, the preamble of the 4-step random access may be determined according to the synchronization signal/physical broadcast channel block (SSB).

Figure 9:
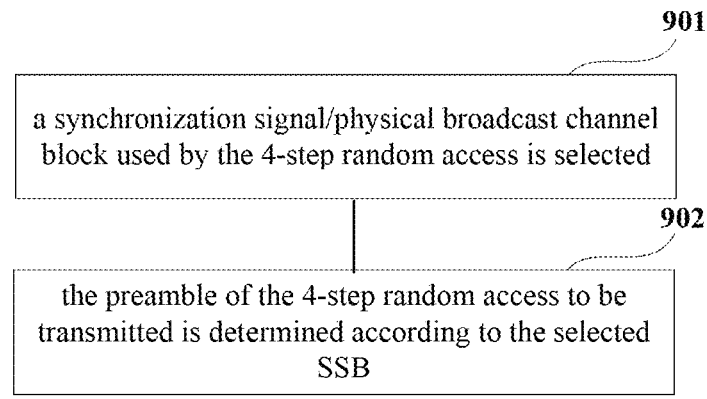
FIG. 9 is a schematic diagram of a method for determining a preamble of 4-step random access according to an SSB of Embodiment 1 of this disclosure.

FIG. 9 is a schematic diagram of a method for determining the preamble of the 4-step random access according to the SSB. As shown in FIG. 9, the method includes:

step 901: a synchronization signal/physical broadcast channel block (SS/PBCH block, SSB) used by the 4-step random access is selected; and step 902: the preamble of the 4-step random access to be transmitted is determined according to the selected SSB.

In step 901, the terminal equipment may measure received power of the synchronization reference signal (SS-RS) of the synchronization signal/physical broadcast channel block (SS/PBCH block, SSB) transmitted by the network device, and select an SS with SSB-RSRP higher than a pre-configured threshold (for example, expressed as rsrp-ThresholdSSB) from the measured SSBs and take the selected SS as the SSB used for the 4-step random access. In addition, if there is no SSB with SSB-RSRP higher than the pre-configured threshold (rsrp-ThresholdSSB) in the measured SSBs, the terminal equipment may select any SSB.

In addition, in step 901, the terminal equipment may not measure the received power of the SSB, but may select the SSB selected in the uncompleted 2-step random access procedure and take it as the SSB used for the 4-step random access.

Figure 10:
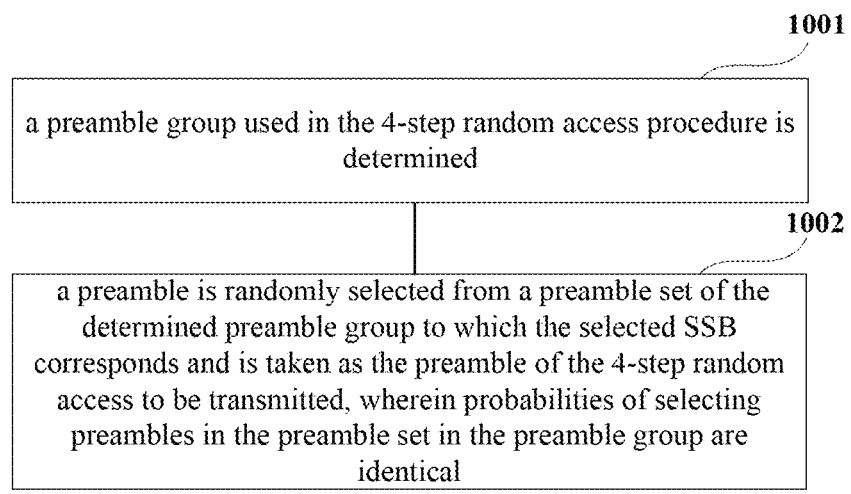
FIG. 10 is a schematic diagram of a method for determining a preamble of 4-step random access according to a selected SSB in step 902 of Embodiment 1 of this disclosure.

FIG. 10 is a schematic diagram of a method for determining the preamble of the 4-step random access according to the selected SSB in step 902. As shown in FIG. 10, the method includes:

step 1001: a preamble group used in the 4-step random access procedure is determined; and step 1002: a preamble is randomly selected from a preamble set of the determined preamble group to which the selected SSB corresponds and is taken as the preamble of the 4-step random access to be transmitted, wherein probabilities of selecting preambles in the preamble set in the preamble group are identical.

In step 1001, the preamble group selected in the uncompleted 2-step random access procedure may be determined as a preamble group used in the 4-step random access procedure.

In step 1001, a preamble group may be reselected. In this implementation, multiple methods may be used to reselect a preamble group.

In a method, in a case where the uncompleted 2-step random access procedure is triggered by a common control logical channel (CCCH), the terminal equipment may determine the preamble group used in the 4-step random access procedure according to a size of a first message (msgA) in the 2-step random access procedure or according to a size of a second message (msg3) in the 4-step random access procedure.

For example, when the size of the first message (msgA) or the size of the second message (msg3) is greater than a set value of the msg3 PDU size threshold (for example, expressed as a parameter ra-Msg3 SizeGroupA) of the preamble group A in the configuration information of 4-step random access, preamble group B is determined to be used; otherwise, preamble group A is determined to be used.

The size of the first message (msgA) is, for example, a size of a media access control layer protocol data unit (MAC PDU) of MsgA, and the size of the second message msg3 is, for example, a size of an MAC PDU of msg3 obtained by copying the MAC PDU of MsgA into an msg3 buffer of the 4-step RACH.

In another method, in a case where the uncompleted 2-step random access procedure is triggered by an uplink data channel, the terminal equipment determines the preamble group used in the 4-step random access procedure according to a size of a media access control layer protocol data unit (MAC PDU) of a potential second message (msg3) of the 4-step random access procedure.

For example, when the media access control layer protocol data unit (MAC PDU) of the second message (msg3) is greater than a value set by a parameter (ra-Msg3 Size-GroupA) of the configuration information of 4-step random access, preamble group B is determined to be used; otherwise, preamble group A is determined to be used.

The size of the media access control layer protocol data unit (MAC PDU) of the second message (msg3) is a size of an MAC PDU composed of a size of uplink data needing to be transmitted plus a header of the MAC PDU and a size of an MAC control unit needing to be transmitted.

In another method, when the uncompleted 2-step random access procedure is triggered by an uplink data channel, the terminal equipment may determine the preamble group used in the 4-step random access procedure according to a current pathloss.

For example, when the current pathloss is less than a preset pathloss threshold, the preamble group B is determined to be used; otherwise, the preamble group A is determined to be used.

The preset pathloss threshold=PCMAX preambleReceivedTargetPower−msg3-DeltaPreamble−messagePowerOffsetGroupB;

where, preambleReceivedTargetPower denotes the initial target received power of the preamble, msg3-DeltaPreamble denotes the target received power offset of msg3, messagePowerOffsetGroupB denotes the target received power offset of the preamble group B selected by the terminal equipment, and PCMAC denotes a permitted maximum transmit power of the terminal equipment.

In step 1002, a preamble is randomly selected from the preamble set of preamble group A or group B to which the SSB determined in step 1001 corresponds as the preamble of the 4-step random access to be transmitted, wherein probabilities of the preambles in the selected preamble set of the preamble group are identical. For example, the preamble group to which the SSB corresponds determined in step 1001 is group A, and in step 1002, a preamble is randomly selected at a uniformly distributed probability from the preamble set of preamble group A and taken as the preamble of the 4-step random access to be transmitted.

As shown in FIG. 8, the method for initiating a 4-step random access procedure by the terminal equipment may further include:

step 804: an uplink transmission resource for transmitting the preamble of the 4-step random access is selected when the 2-step random access is not completed.

In step 804, the terminal equipment may select a next available physical random access channel (PRACH) transmission occasion from a permitted preamble transmission occasion set identified by a preamble transmission occasion configuration parameter in the configuration information of the 4-step random access and take it as the physical random access channel (PRACH) transmission occasion for transmitting the preamble of the 4-step random access when the 2-step random access is not completed.

Reference may be made to FIG. 7 and related description for description of "a next available physical random access channel (PRACH) transmission occasion".

As shown in FIG. 8, the method for initiating a 4-step random access procedure by the terminal equipment may further include:

step 805: the target received power of the random access preamble is calculated; and step 806: the transmit power of the random access preamble is calculated according to the target received power and pathloss of the random access preamble.

In step 805 of this embodiment, the target received power of the random access preamble may be calculated by using multiple methods.

In a method, the target received power of the random access preamble may be calculated according to an initial target received power parameter preambleReceivedTargetPower of the random access preamble, a first target received power offset value DELTA_PREAMBLE, a power ramping counting value of the random access preamble (PREAMBLE_POWER_RAMPING_COUNTER) and a power ramping step factor of the random access preamble (PREAMBLE_POWER_RAMPING_STEP).

In this method, for example, the target received power of the random access preamble may be calculated by using formula (1) above:

Random access preamble target received power=preambleReceivedTargetPower+DELTA_PREAMBLE+(PREAMBLE_POWER_RAMPING_COUNTER−1)×PREAMBLE_POWER_RAMPING_STEP  (1);

where, the power ramping step factor of the random access preamble PREAMBLE_POWER_RAMPING_STEP and the target received power parameter of the initial random access preamble preambleReceivedTargetPower are parameters obtained from the configuration information of the 4-step random access, and the first target received power offset value DELTA_PREAMBLE is a preset parameter related to a preamble format and a subcarrier spacing for transmitting the preamble.

In another method, the target received power of the random access preamble may be calculated according to the initial target received power parameter preambleReceivedTargetPower of the random access preamble, the first target received power offset value DELTA_PREAMBLE, the power ramping counting value of the random access preamble (PREAMBLE_POWER_RAMPING_COUNTER), the power ramping step factor of the random access preamble (PREAMBLE_POWER_RAMPING_STEP) and a second target received power offset value delta_fallback_TargetPower.

In this method, for example, the target received power of the random access preamble may be calculated by using formula (6) below:

Random access target received power=preambleReceivedTargetPower+DELTA_PREAMBLE+(PREAMBLE_POWER_RAMPING_COUNTER−1)×PREAMBLE_POWER_RAMPING_STEP+delta_fallback_TargetPower  (6).

In this method, the second target received power offset value delta_fallback_TargetPower is a value greater than zero. Thus, the target received power is higher than that of ordinary random access, so that a priority of the 4-step random access procedure is higher than that of an ordinary random access procedure.

In this method, the second target received power offset value delta_fallback_TargetPower is a preset fixed value, or it is related to a ramping amplitude of target received power of the preamble of the uncompleted 2-step random access.

For example, the second target received power offset value delta_fallback_TargetPower is linearly related to the ramping amplitude of the target received power of the preamble of the uncompleted 2-step random access.

In a particular example, delta_fallback_TargetPower may be calculated by using formula (3) above.

In a further method, the target received power of the random access preamble may be calculated according to the initial target received power parameter preambleReceivedTargetPower of the random access preamble, the first target received power offset value DELTA_PREAMBLE, the power ramping counting value of the random access preamble (PREAMBLE_POWER_RAMPING_COUNTER), the power ramping step factor of the random access preamble (PREAMBLE_POWER_RAMPING_STEP) and the target received power ramping step offset value delta_fallback_step.

In this method, for example, the target received power of the random access preamble may be calculated by using formula (7) below:

Random access preamble target received power=preambleReceivedTargetPower+DELTA_PREAMBLE+(PREAMBLE_POWER_RAMPING_COUNTER−1)×(PREAMBLE_POWER_RAMPING_STEP+delta_fallback_step)    (7).

In this method, the target received power ramping step offset value delta_fallback_step is a value greater than zero. Thus, the target received power ramps faster than that of an ordinary random access, so that a priority of the 4-step random access procedure may be higher than a priority of an ordinary random access procedure.

In the above formulae (5), (6) and (7), an initial value of the power ramping count value of the random access preamble (PREAMBLE_POWER_RAMPING_COUNTER) may be equal to:

a preset initial value, that is, when the terminal equipment initiates a 4-step random access procedure, the initial value of the power ramping count value of the random access preamble (PREAMBLE_POWER_RAMPING_COUNTER) is the preset initial value, the preset initial value being, for example, 1; or, the preamble power ramping count value of the uncompleted 2-step random access, that is, when the terminal equipment initiates a 4-step random access procedure, the initial value of the power ramping count value of the random access preamble (PREAMBLE_POWER_RAMPING_COUNTER) is equal to a current value of the power ramping count of the preamble of the uncompleted 2-step random access.

In step 806 of this embodiment, reference may be made to the relevant art for a particular method for calculating the transmit power of the random access preamble, which shall not be described in this embodiment any further.

As shown in FIG. 8, the method for initiating a 4-step random access procedure by the terminal equipment to may further include:

step 807: the 4-step random access preamble is transmitted when the 2-step random access is not completed according to the selected random access preamble, an uplink transmission resource of the selected random access preamble and the calculated transmit power of the random access preamble.

According to this embodiment, the terminal equipment initiates the non-contention random access procedure or the 4-step random access procedure when the 2-step random access procedure is not completed. Thus, in case of failure of the 2-step random access procedure, a problem of increase of transmission latency may be avoided.

Embodiment 2

Embodiment 2 provides a random access method, applicable to a network device.

Figure 11:
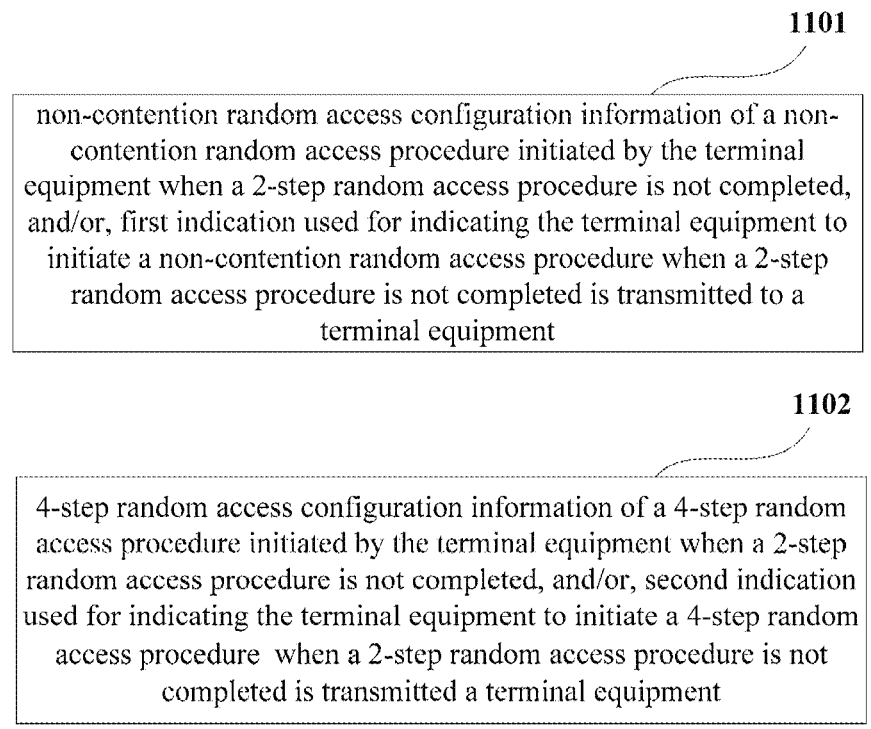
FIG. 11 is a schematic diagram of the random access method of Embodiment 2 of this disclosure.

FIG. 11 is a schematic diagram of the random access method of Embodiment 2.

As shown in FIG. 11, the method includes:

step 1101: non-contention random access configuration information of a non-contention random access procedure initiated by the terminal equipment when a 2-step random access procedure is not completed, and/or, first indication used for indicating the terminal equipment to initiate a non-contention random access procedure when a 2-step random access procedure is not completed is transmitted to a terminal equipment; or step 1102: 4-step random access configuration information of a 4-step random access procedure initiated by the terminal equipment when a 2-step random access procedure is not completed, and/or, second indication used for indicating the terminal equipment to initiate a 4-step random access procedure when a 2-step random access procedure is not completed is transmitted to a terminal equipment.

In step 1101 of this embodiment, the first indication may be transmitted via an RRC message, and/or a physical downlink control channel (PDCCH) indication of a physical layer, and/or a random access response message of a media access control (MAC) layer; wherein the RRC message may be a system broadcast message, or may be a dedicated RRC message.

In step 1102 of this embodiment, the second indication may be transmitted via an RRC message, and/or a random access response message of a media access control (MAC) layer; wherein the RRC message may be a system broadcast message, or may be a dedicated RRC message.

In this embodiment, the random access response message of the MAC layer in step 1101 or 1102 does not carry contention resolution information and/or does not carry an uplink transmission grant. In this embodiment, the configuration information of the non-contention random access includes at least: configuration information of a candidate SSB of the non-contention random access and configuration information of a preamble to which the candidate SSB corresponds; or configuration information of a candidate channel state information reference signal (CSI-RS) of non-contention random access, and configuration information of a preamble to which the channel state information reference signal (CSI-RS) corresponds and configuration information of a transmission occasion of the preamble.

In step 1101 of this embodiment, the configuration information of the non-contention random access may be transmitted via an RRC message, and/or a physical downlink control channel (PDCCH) indication of a physical layer, and/or a random access response message of a media access control (MAC) layer.

In this implementation, the RRC message used for transmitting the configuration information of the non-contention random access in step 1101 may be a dedicated RRC message for the terminal equipment.

In step 1102 of this embodiment, the network device may transmit the configuration information of the 4-step random access via system broadcast information.

For example, the second indication may be payload indication information of a random access channel transmitted by the network device, and the terminal equipment may decide to initiate a 4-step random access procedure according to the payload indication information of a random access channel. That is, the network device may detect a preamble transmission occasion of the 2-step random access and/or a collision rate or a payload condition in a PUSCH transmission occasion, or it may further detect a collision rate or a payload condition in the preamble transmission occasion of the 4-step contention random access, and take the payload information of the random access channel as the second indication and transmit to the terminal equipment.

In a case where the above second indication is the payload indication information of the random access channel, the payload indication information may be a payload factor from 0 to 1.

In a method, the smaller the payload factor identifies that the 2-step random access channel is more idle. After receiving the second indication, the terminal generates a random number between 0 and 1 at a uniformly distributed probability. If the random number is greater than the payload factor, the terminal equipment initiates the 4-step random access procedure; otherwise, the terminal equipment continues to initiate the 2-step random access procedure.

In another method, the smaller the payload factor identifies that the collision rate and payload of the 2-step random access channel are higher. After receiving the second indication, the terminal generates a random number between 0 and 1 at a uniformly distributed probability. If the random number is less than the payload factor, the terminal equipment initiates the 4-step random access procedure; otherwise, the terminal equipment continues to initiate the 2-step random access procedure.

In this embodiment, the 2-step random access procedure being not completed refers to at least one of the following cases where:

- no random access response is received in a random access response reception window after a first message (MsgA) of the 2-step random access procedure is transmitted by the terminal equipment;
- random access contention resolution in the 2-step random access procedure is not successful;
- the number of times of transmitting 2-step random access preambles (PREAMBLE_TRANSMISSION_COUNTER) by the terminal equipment reaches a maximum threshold; and
- power for transmitting the 2-step random access preambles by the terminal equipment and/or power of a physical uplink shared channel (PUSCH) reach/reaches a maximum threshold (Pcmax).

According to this embodiment, the network device transmits the configuration information of non-contention random access and/or the first indication to the terminal equipment, or transmits the configuration information of 4-step random access and/or the second indication to the terminal equipment. Hence, when the 2-step random access procedure is not completed, the terminal equipment is able to initiate a non-contention random access procedure or a 4-step random access procedure, thereby avoiding increase in transmission latency and improving random access efficiency.

Embodiment 3

Embodiment 3 provides a random access device, corresponding to the random access method in Embodiment 1. As a principle of the device for solving problems is similar to that of the method of Embodiment 1, reference may be made to the implementation of the method in Embodiment 1 for implementation of this apparatus, with identical parts being not going to be described herein any further.

Figure 12:
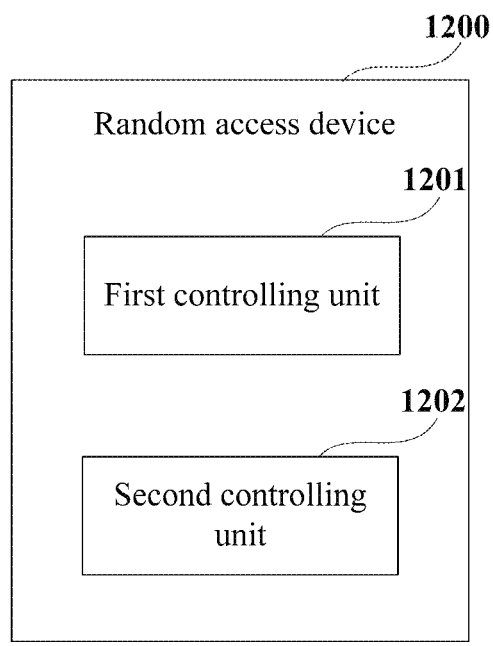
FIG. 12 is a schematic diagram of the random access device of Embodiment 3 of this disclosure.

FIG. 12 is a schematic diagram of the random access device of Embodiment 3.

As shown in FIG. 12, a random access device 1200 includes: a first controlling unit 1201 and a second controlling unit 1202.

The first controlling unit 1201 controls a terminal equipment to initiate a 2-step random access procedure; and the second controlling unit 1202 controls the terminal equipment to initiate a non-contention random access procedure or a 4-step random access procedure when the 2-step random access procedure is not completed.

In this embodiment, the random access device 1200 is configured in the terminal equipment, and may control the terminal equipment, so that the terminal equipment carries out the random access method in Embodiment 1. Reference may be made to description of actions of the terminal equipment in Embodiment 1 for controlling actions of the random access device 1200.

Embodiment 4

Embodiment 4 provides a random access device, corresponding to the random access method in Embodiment 2. As a principle of the device for solving problems is similar to that of the method of Embodiment 2, reference may be made to the implementation of the method in Embodiment 2 for implementation of this apparatus, with identical parts being not going to be described herein any further.

Figure 13:
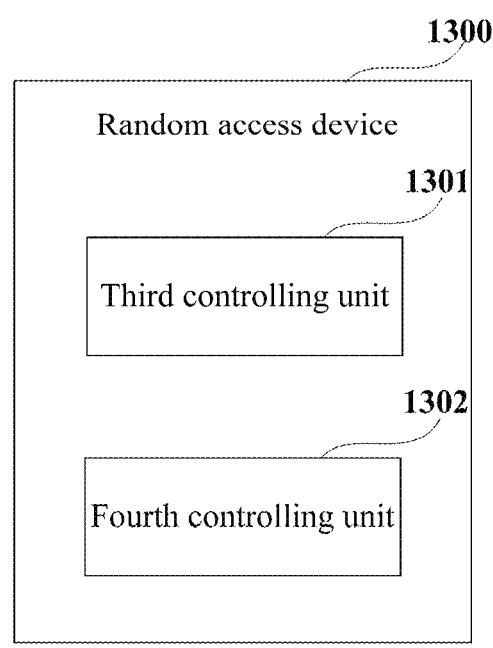
FIG. 13 is a schematic diagram of the random access device of Embodiment 4 of this disclosure.

FIG. 13 is a schematic diagram of the random access device of Embodiment 4.

As shown in FIG. 13, a random access device 1300 includes: a third controlling unit 1301 or a fourth controlling unit 1302.

In this embodiment, the third controlling unit 1301 is configured to control a network device to transmit to a terminal equipment, non-contention random access configuration information of a non-contention random access procedure initiated by the terminal equipment when a 2-step random access procedure is not completed, and/or, first indication used for indicating the terminal equipment to initiate a non-contention random access procedure when a 2-step random access procedure is not completed; and the fourth controlling unit 1302 is configured to control the network device to transmit to a terminal equipment, 4-step random access configuration information of a 4-step random access procedure initiated by the terminal equipment when a 2-step random access procedure is not completed, and/or, second indication used for indicating the terminal equipment to initiate a 4-step random access procedure when a 2-step random access procedure is not completed.

In this embodiment, the random access device 1300 is configured in the network device, and may control the network device, so that the network device carries out the random access method in Embodiment 2. Reference may be made to description of actions of the network device in Embodiment 2 for controlling actions of the random access device 1300.

Embodiment 5

Embodiment 5 provides a terminal equipment. As a principle of the equipment for solving problems is similar to that of the device of Embodiment 3, reference may be made to the implementation of the device in Embodiment 3 for implementation of this equipment, with identical parts being not going to be described herein any further.

Figure 14:
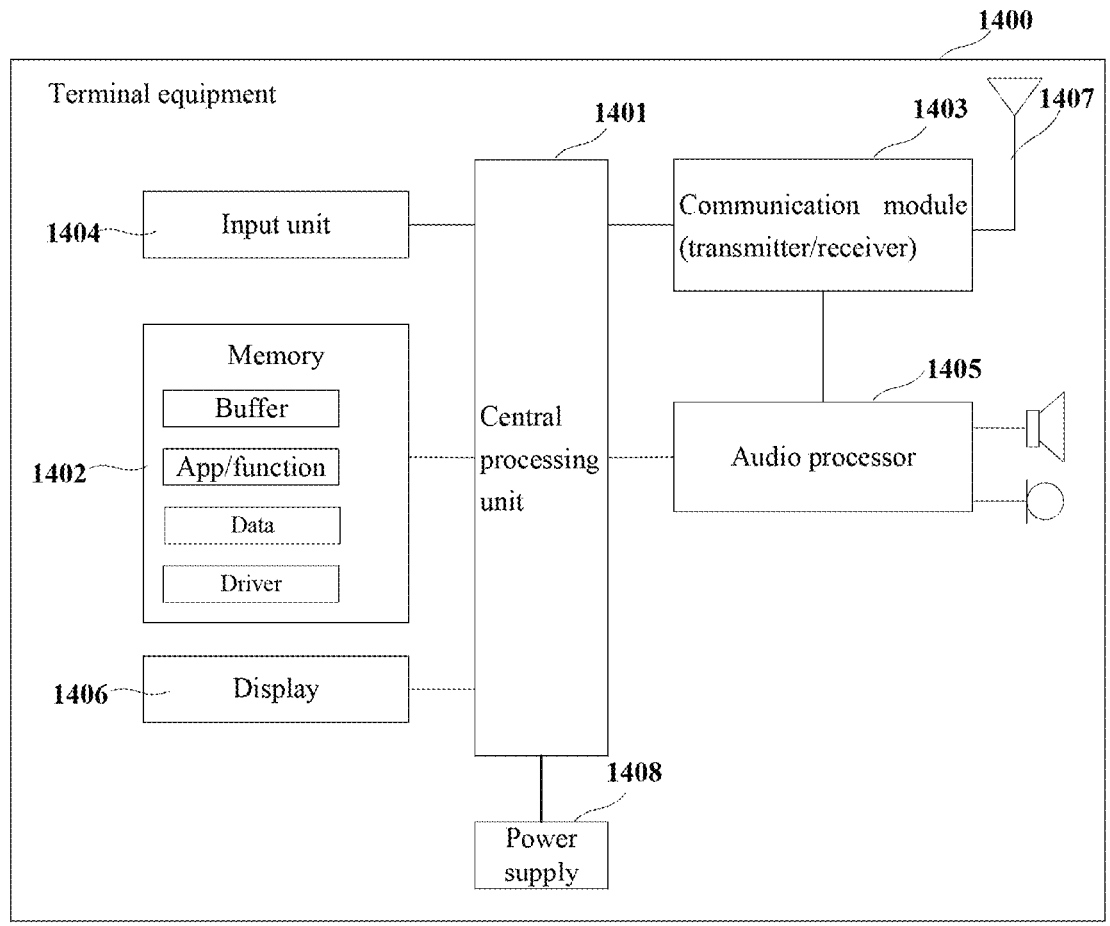
FIG. 14 is a schematic diagram of the terminal equipment of Embodiment 5 of this disclosure.

FIG. 14 is a schematic diagram of a structure of the terminal equipment of the embodiment of this disclosure. As shown in FIG. 14, a terminal equipment 1400 may include a central processing unit (CPU) 1401 and a memory 1402, the memory 1402 being coupled to the central processing unit 1401. The memory 1402 may store various data, and furthermore, it may store a program for data processing, and execute the program under control of the central processing unit 1401, so as to instruct a terminal equipment according to received signaling.

In one implementation, the functions of the device 1200 described in Embodiment 3 may be integrated into the central processing unit 1401 of the terminal equipment 1400. The central processing unit 1401 may be configured to carry out the method described in Embodiment 1.

For example, the central processing unit 1401 may be configured to control, so that the terminal equipment 1400 carries out the method in Embodiment 1.

In addition, reference may be made to Embodiment 1 for other configuration modes of the central processing unit 1401, which shall not be described herein any further.

In another implementation, the device 1200 described and the central processing unit 1401 may be configured separately; for example, the device 1200 may be configured as a chip connected to the central processing unit 1401, such as the units shown in FIG. 14, and the functions of the device 1200 are executed under control of the central processing unit 1401.

Furthermore, as shown in FIG. 14, the terminal equipment 1400 may include a communication module 1403, an input unit 1404, a display 1406, an audio processor unit 1405, an antenna 1407, and a power supply 1408, etc.

According to this embodiment, the terminal equipment initiates the non-contention random access procedure or the 4-step random access procedure when the 2-step random access procedure is not completed, thereby avoiding increase in transmission latency and improving random access efficiency.

Embodiment 6

Embodiment 6 provides a network device. As a principle of the device for solving problems is similar to that of the method of Embodiment 2, reference may be made to the implementation of the method of Embodiment 2 for implementation of this device, with identical parts being not going to be described herein any further.

Figure 15:
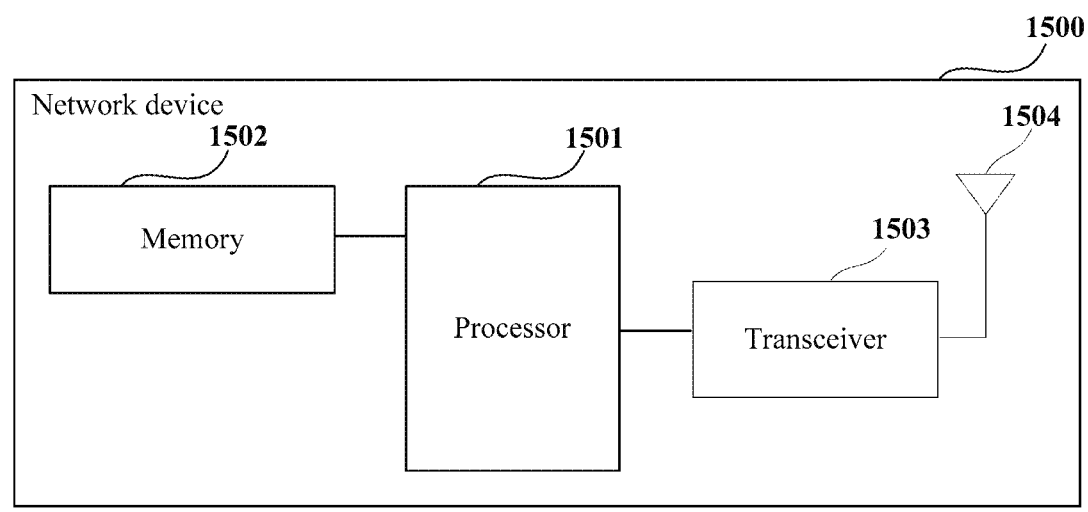
FIG. 15 is a schematic diagram of the network device of Embodiment 6 of this disclosure.

FIG. 15 is a schematic diagram of a structure of the network device of the embodiment of this disclosure. As shown in FIG. 15, a network device 1500 may include a central processing unit (CPU) 1501 and a memory 1502, the memory 1502 being coupled to the central processing unit 1501. The memory 1502 may store various data, and furthermore, it may store a program for data processing, and execute the program under control of the central processing unit 1501.

In one implementation, the functions of the device 1300 described in Embodiment 4 may be integrated into the central processing unit 1501. The central processing unit 1501 may be configured to carry out the method described in Embodiment 2.

For example, the central processing unit 1501 may be configured to control, so that the network device 1500 carries out the method described in Embodiment 2.

In addition, reference may be made to Embodiment 2 for other configuration modes of the central processing unit 1501, which shall not be described herein any further.

In another implementation, the device 1300 and the central processing unit 1501 may be configured separately; for example, the device 1300 may be configured as a chip connected to the central processing unit 1501, such as the units shown in FIG. 15, and the functions of the device 1300 are executed under control of the central processing unit 1501.

Furthermore, as shown in FIG. 15, the network device 1500 may include a transceiver 1503, an antenna 1504, a display, an audio processor, and a power supply, etc. Functions of the above components are similar to those in the relevant art, and shall not be described herein any further. It should be noted that the network device 1500 does not necessarily include all the parts shown in FIG. 15. Furthermore, the network device 1500 may include parts not shown in FIG. 15, and the relevant art may be referred to.

Embodiment 7

The embodiment of this disclosure provides a communication system, at least including the network device 1500 described in Embodiment 6 and the terminal equipment 1400 described in Embodiment 5. Contents of Embodiment 5 and Embodiment 6 are incorporated herein, and shall not be described herein any further.

An embodiment of this disclosure provides a computer storage medium, including a computer readable program, which will cause a random access device or a terminal equipment to carry out the random access method described in Embodiment 1.

An embodiment of this disclosure provides a computer readable program, which, when executed in a random access device or a terminal equipment, will cause the random access device or the terminal equipment to carry out the random access method described in Embodiment 1.

An embodiment of this disclosure provides a computer storage medium, including a computer readable program, which will cause a random access device or a network device to carry out the random access method described in Embodiment 2.

An embodiment of this disclosure provides a computer readable program, which, when executed in a random access device or a network device, will cause the random access device or the network device to carry out the random access method described in Embodiment 2.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods carried out in the devices described with reference to the embodiments of this disclosure may be directly embodied as hardware, software modules executed by a processor, or a combination thereof. For example, one or more functional block diagrams and/or one or more combinations of the functional block diagrams shown in FIGS. 12 and 13 may either correspond to software modules of procedures of a computer program, or correspond to hardware modules. Such software modules may respectively correspond to the steps shown in FIG. 2. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIGS. 12 and 13 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIGS. 12 and 13 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of this disclosure. Various variants and modifications may be made by those skilled in the art according to the principle of this disclosure, and such variants and modifications fall within the scope of this disclosure.

Following supplements are further provided in this disclosure.

1. A random access method, applicable to a terminal equipment, the method including: initiating a 2-step random access procedure by the terminal equipment; and initiating a non-contention random access procedure or a 4-step random access procedure by the terminal equipment when the 2-step random access procedure is not completed.

2. The method according to supplement 1, wherein the 2-step random access procedure being not completed refers to at least one of the following cases where:
no random access response is received in a random access response reception window after a first message (MsgA) of the 2-step random access procedure is transmitted;
random access contention resolution in the 2-step random access procedure is not successful;
the number of times of transmitting 2-step random access preambles reaches a maximum threshold; and
power for transmitting the 2-step random access preambles and/or power of a physical uplink shared channel (PUSCH) reach/reaches a maximum threshold.

3. The method according to either one of supplements 1-2, wherein the initiating the non-contention random access procedure or the 4-step random access procedure includes:
determining to initiate the non-contention random access procedure if configuration information of non-contention random access is stored, or determining to initiate the 4-step random access procedure by the terminal equipment; or
initiating the non-contention random access procedure according to first indication of a network device if configuration information of non-contention random access is stored, or determining to initiate the 4-step random access procedure by the terminal equipment according to second indication of a network device.

4. The method according to supplement 3, wherein, the configuration information of the non-contention random access at least includes:
configuration information of a candidate synchronization signal/physical broadcast channel block (SS/PBCH block, SSB) of the non-contention random access, and configuration information of a preamble corresponding to the candidate synchronization signal/physical broadcast channel block; or
configuration information of a candidate channel state information reference signal (CSI-RS) of the non-contention random access, and configuration information of a preamble to which the channel state information reference signal (CSI-RS) corresponds and configuration information of a transmission occasion of the preamble.

5. The method according to supplement 3 or 4, wherein, the configuration information of the non-contention random access is received via a radio resource control (RRC) message, and/or a physical downlink control channel (PDCCH) indication of a physical layer, and/or a random access response message of a media access control (MAC) layer.

6. The method according to any one of supplements 3-5, wherein,
the first indication is received via an RRC message, and/or a physical downlink control channel (PDCCH) indication of a physical layer, and/or a random access response message of a media access control (MAC) layer.

7. The method according to any one of supplements 3-5, wherein,
the second indication is received via a radio resource control (RRC) message, and/or a random access response message of a media access control (MAC) layer.

8. The method according to supplement 6 or 7, wherein, the random access response message of the MAC layer does not carry contention resolution information and/or does not carry an uplink transmission grant.

9. The method according to any one of supplements 1-7, wherein,
the initiating a non-contention random access procedure includes:
performing initialization of the non-contention random access procedure when the 2-step random access is not completed;
and the initiating a 4-step random access procedure includes:
performing initialization of the 4-step random access procedure when the 2-step random access is not completed.

10. The method according to supplement 9, wherein,
in performing the initialization of the non-contention random access procedure when the 2-step random access is not completed,
configured non-contention random access parameters include common parameters and dedicated parameters;

wherein,
the common parameters are obtained from the configuration information of the non-contention random access, and/or obtained from parameters reused in original non-contention random access parameters,
and the dedicated parameters are obtained from the configuration information of the non-contention random access.

11. The method according to supplement 9, wherein, in performing the initialization of the 4-step random access procedure when the 2-step random access is not completed,
configured 4-step random access parameters are obtained from the received configuration information of the 4-step random access and/or obtained from parameters reused in original contention random access parameters.

12. The method according to any one of supplements 9-11, wherein,
the initiating the non-contention random access procedure further includes: determining a preamble of the non-contention random access to be transmitted when the 2-step random access is not completed;
and the initiating the 4-step random access procedure further includes:
determining a preamble of the 4-step random access to be transmitted when the 2-step random access is not completed.

13. The method according to supplement 12, wherein the determining a preamble of the non-contention random access to be transmitted when the 2-step random access is not completed includes:
measuring synchronization reference signal (SS-RS) received power of candidate synchronization signal/physical broadcast channel blocks (SS/PBCH Blocks, SSBs) in the configuration information of the non-contention random access, and selecting a used synchronization signal/physical broadcast channel block (SS/PBCH block, SSB) from the candidate synchronization signal/physical broadcast channel blocks (SS PBCH blocks, SSBs); and
determining a preamble to which the selected synchronization signal/physical broadcast channel block (SS/PBCH Block, SSB) corresponds as the preamble of the non-contention random access to be transmitted.

14. The method according to supplement 12, wherein the determining a preamble of the non-contention random access to be transmitted when the 2-step random access is not completed includes:
measuring received power of candidate channel state information reference signals (CSI-RSs) in the configuration information of the non-contention random access, and selecting a channel state information reference signal from the candidate channel state information reference signals (CSI-RSs); and determining a preamble to which the selected channel state information reference signal corresponds as the preamble of the non-contention random access to be transmitted.

15. The method according to supplement 12, wherein the determining a preamble of the 4-step random access to be transmitted when the 2-step random access is not completed includes:
measuring synchronization reference signal (SS-RS) received power of synchronization signal/physical broadcast channel blocks (SS/PBCH Blocks, SSBs) transmitted by the network device, and selecting a synchronization signal/physical broadcast channel block (SS/PBCH block, SSB) used in the 4-step random access; and
determining the preamble of the 4-step random access to be transmitted according to the selected SSB.

16. The method according to supplement 15, wherein the determining the preamble of the 4-step random access to be transmitted according to the selected SSB includes:
determining a preamble group used in the 4-step random access procedure; and
randomly selecting a preamble from a preamble set of the determined preamble group to which the selected SSB corresponds as the preamble of the 4-step random access to be transmitted; wherein, probabilities of selecting each preamble in the preamble set of the preamble group are identical.

17. The method according to supplement 16, wherein the determining a preamble group used in the 4-step random access procedure includes:
determining the preamble group used in the 4-step random access procedure as a preamble group selected in the 2-step random access procedure that is not completed.

18. The method according to supplement 16, wherein the determining a preamble group used in the 4-step random access procedure includes:
in a case where the 2-step random access procedure is triggered by a common control logical channel (CCCH),
according to a size of the first message (msg A) in the 2-step random access procedure or according to a size of the second message (msg3) of the 4-step random access procedure, determining the preamble group (A or B) used in the 4-step random access procedure.

19. The method according to supplement 18, wherein,
when the size of the first message (msg A) or the size of the second message (msg3) is greater than a set value of a size threshold parameter of Group A (ra-Msg3 SizeGroupA) in the configuration information of the 4-step random access, it is determined that the preamble Group B is used, otherwise, it is determined that the preamble Group A is used.

20. The method according to supplement 16, wherein the determining a preamble group used in the 4-step random access procedure includes:
in a case where the 2-step random access procedure is triggered by an uplink data channel,
according to a size of a potential media access control protocol data unit (MAC PDU) of the second message (msg3) of the 4-step random access procedure, determining the preamble group (A or B) used in the 4-step random access procedure.

21. The method according to supplement 20, wherein,
when the size of the media access control protocol data unit (MAC PDU) of the second message (msg3) is greater than the set value of the size threshold parameter of Group A (ra-Msg3 SizeGroupA) in the configuration information of the 4-step random access, it is determined that the preamble Group B is used, otherwise, it is determined that the preamble Group A is used.

22. The method according to supplement 16, wherein the determining a preamble group used in the 4-step random access procedure includes:
in a case where the 2-step random access procedure is triggered by an uplink data channel, determining the preamble group (A or B) used in the 4-step random access procedure according to a current pathloss.

23. The method according to supplement 22, wherein, if the current pathloss is less than a preset pathloss threshold, it is determined that the preamble Group B is used, otherwise, it is determined that the preamble Group A is used.

24. The method according to supplement 12, wherein, the initiating the non-contention random access procedure further includes:
selecting uplink transmission resources for transmitting the preamble of the non-contention random access when the 2-step random access is not completed;
and the initiating the 4-step random access procedure further includes:
selecting uplink transmission resources for transmitting the preamble of the 4-step random access when the 2-step random access is not completed.

25. The method according to supplement 24, wherein the selecting uplink transmission resources for transmitting the preamble of the non-contention random access when the 2-step random access is not completed includes:
according to the synchronization signal/physical broadcast channel block (SS/PBCH block) selected from the candidate synchronization signal/physical broadcast channel block (SS/PBCH block) of the non-contention random access or the channel state information reference signal (CSI-RS) selected from the candidate channel state information reference signal (CSI-RS) of the non-contention random access, selecting a physical random access channel occasion (PRACH occasion) for transmitting the preamble of the non-contention random access when the 2-step random access is not completed.

26. The method according to supplement 25, wherein, if the SSB is selected, a next available physical random access channel (PRACH) transmission occasion is selected from an allowed preamble transmission occasion set identified by a physical random access channel (PRACH) transmission occasion configuration parameter (ra-ssb-OccasionMaskIndex) in the configuration information of the non-contention random access to which the SSB corresponds;
and if the CSI-RS is selected, a next available physical random access channel (PRACH) transmission occasion is selected from allowed preamble transmission occasions identified by a physical random access channel (PRACH) transmission occasion configuration parameter (ra-OccasionList) in the configuration information of the non-contention random access to which the CSI-RS corresponds.

27. The method according to supplement 24, wherein the selecting uplink transmission resources for transmitting the preamble of the 4-step random access when the 2-step random access is not completed includes:
selecting a next available physical random access channel (PRACH) transmission occasion from an allowed preamble transmission occasion set identified by a preamble transmission occasion configuration parameter in the configuration information of the 4-step random access, and taking the selected next available physical random access channel (PRACH) transmission occasion as a physical random access channel (PRACH) transmission occasion of the preamble of the 4-step random access when the 2-step random access is not completed.

28. The method according to supplement 24, wherein the initiating the non-contention random access procedure or the 4-step random access procedure further includes:
calculating target received power of the random access preamble; and
calculating transmission power of the random access preamble according to the target received power and the pathloss of the random access preamble.

29. The method according to supplement 28, wherein the calculating the target received power of the random access preamble includes:
calculating the target received power of the random access preamble according to an initial target received power parameter (preambleReceivedTargetPower) of the random access preamble, a first target received power offset value (DELTA_PREAMBLE), a power ramping count value of the random access preamble (PREAMBLE_POWER_RAMPING_COUNTER), and a power ramping step factor of the random access preamble (PREAMBLE_POWER_RAMPING_STEP).

30. The method according to supplement 29, wherein, the target received power of the random access preamble is also calculated according to a second target received power offset value (delta_fallback_TargetPower); or, the target received power of the random access preamble is also calculated according to a target received power ramping step offset value (delta_fallback_step).

31. The method according to supplement 30, wherein, the second target received power offset value (delta_fallback_TargetPower) is a preset fixed value, or is related to a ramping amplitude of the target received power of the preamble of the 2-step random access that is not completed.

32. The method according to any one of supplements 29-31, wherein,
an initial value of the power ramping count value of the random access preamble (PREAMBLE_POWER_RAMPING_COUNTER) is:
a preset initial value; or
a preamble power ramping count value of the 2-step random access that is not completed.

33. The method according to supplement 28, wherein the initiating the non-contention random access procedure or the 4-step random access procedure further includes:
according to the selected random access preamble, the uplink transmission resources of the random access preamble and the transmission power of the calculated random access preamble, transmitting the non-contention random access preamble or the 4-step random access preamble when the 2-step random access is not completed.

34. A random access method, applicable to a network device, the method including:
transmitting to a terminal equipment, non-contention random access configuration information of a non-contention random access procedure initiated by the terminal equipment when a 2-step random access procedure is not completed, and/or, first indication used for indicating the terminal equipment to initiate a non-contention random access procedure when a 2-step random access procedure is not completed; or
transmitting to a terminal equipment, 4-step random access configuration information of a 4-step random access procedure initiated by the terminal equipment when a 2-step random access procedure is not completed, and/or, second indication used for indicating the terminal equipment to initiate a 4-step random access procedure when a 2-step random access procedure is not completed.

35. The method according to supplement 34, wherein, the first indication is transmitted via an RRC message, and/or a physical downlink control channel (PDCCH) indication of a physical layer, and/or a random access response message of a media access control (MAC) layer.

36. The method according to supplement 34, wherein, the second indication is transmitted via an RRC message, and/or a random access response message of a media access control (MAC) layer.

37. The method according to supplement 35 or 36, wherein, the random access response message of the MAC layer does not carry contention resolution information and/or does not carry an uplink transmission grant.

38. The method according to any one of supplements 34-37, wherein the configuration information of the non-contention random access includes at least:
configuration information of a candidate SSB of the non-contention random access and configuration information of a preamble to which the candidate SSB corresponds; or
configuration information of a candidate channel state information reference signal (CSI-RS) of non-contention random access, and configuration information of a preamble to which the channel state information reference signal (CSI-RS) corresponds and configuration information of a transmission occasion of the preamble.

39. The method according to supplement 34, wherein, the configuration information of the non-contention random access is transmitted via an RRC message, and/or a physical downlink control channel (PDCCH) indication of a physical layer, and/or a random access response message of a media access control (MAC) layer.

40. The method according to any one of supplements 34-37, wherein, the configuration information of the 4-step random access is transmitted via system broadcast information.

41. The method according to supplement 34, wherein the 2-step random access procedure being not completed refers to at least one of the following cases where:
no random access response is received in a random access response reception window after a first message (MsgA) of the 2-step random access procedure is transmitted by the terminal equipment;
random access contention resolution in the 2-step random access procedure is not successful;
the number of times of transmitting 2-step random access preambles (PREAMBLE_TRANSMISSION_COUNTER) by the terminal equipment reaches a maximum threshold; and
power for transmitting the 2-step random access preambles by the terminal equipment and/or power of a physical uplink shared channel (PUSCH) reach/reaches a maximum threshold (Pcmax).

What is claimed is:

1. A random access device, applicable to a terminal equipment, the device comprising:
first controlling circuitry configured to control the terminal equipment to initiate a two-step random access procedure; and
second controlling circuitry configured to control the terminal equipment to initiate a four-step random access procedure when a number of times of two-step random access preamble(s) transmission reaches a first maximum threshold and no random access response is received in a random access response reception window after a first message (MsgA) of the two-step random access procedure is transmitted,
wherein initiating the four-step random access procedure at least comprises initialization of:
a power ramping step factor of the four-step random access procedure; and
a maximum number of times of transmission of preambles of the four-step random access procedure,
wherein the initiating the four-step random access procedure comprises:
measuring synchronization reference signal (SS-RS) received power of synchronization signal/physical broadcast channel blocks (SS/PBCH Blocks, SSBs) transmitted by a network device, and selecting a synchronization signal/physical broadcast channel block (SS/PBCH block, SSB) used in the four-step random access procedure; and
determining a preamble of the four-step random access procedure to be transmitted according to the selected SSB.

2. The device according to claim 1, wherein the determining the preamble of the four-step random access procedure to be transmitted according to the selected SSB comprises:
determining a preamble group used in the four-step random access procedure; and
randomly selecting a preamble from a preamble set of the determined preamble group to which the selected SSB corresponds as the preamble of the four-step random access procedure to be transmitted; wherein, probabilities of selecting each preamble in the preamble set of the preamble group are identical.

3. The device according to claim 2, wherein the determining a preamble group used in the four-step random access procedure comprises:
determining the preamble group used in the four-step random access procedure as a preamble group selected in the two-step random access procedure that is not completed.

4. The device according to claim 1, wherein, the initiating the four-step random access procedure further comprises:
selecting uplink transmission resources for transmitting the preamble of the four-step random access procedure when the two-step random access procedure is not completed.

5. The device according to claim 4, wherein the selecting uplink transmission resources for transmitting the preamble of the four-step random access procedure when the two-step random access procedure is not completed comprises:
selecting a next available physical random access channel (PRACH) transmission occasion from an allowed preamble transmission occasion set identified by a preamble transmission occasion configuration parameter in configuration information of the four-step random access procedure, and taking the selected next available physical random access channel (PRACH) transmission occasion as a physical random access channel (PRACH) transmission occasion of the preamble of the four-step random access procedure when the two-step random access procedure is not completed.

6. The device according to claim 4, wherein the initiating four-step random access procedure further comprises:
calculating target received power of the preamble of the four-step random access procedure (four-step random access preamble);
calculating transmission power of the four-step random access preamble according to the target received power and the pathloss of the four-step random access preamble.

7. The device according to claim 6, wherein the calculating the target received power of the four-step random access preamble comprises:
calculating the target received power of the four-step random access preamble according to an initial target received power parameter (preambleReceivedTargetPower) of the four-step random access preamble, a first target received power offset value (DELTA_PREAMBLE), a power ramping count value (PREAMBLE_ POWER_RAMPING_COUNTER) of the four-step random access preamble, and the power ramping step factor (PREAMBLE_POWER_RAMPING_STEP) of the four-step random access preamble.

8. The device according to claim 7, wherein,
the target received power of the four-step random access preamble is in addition calculated according to a second target received power offset value (delta_fallback_TargetPower); or,
the target received power of the four-step random access preamble is in addition calculated according to a target received power ramping step offset value (delta_fallback_step).

9. The device according to claim 8, wherein, calculating the target received power of the four-step random access preamble comprises:
calculating the target received power of the four-step random access preamble as
PREAMBLE_RECEIVED_TARGET_POWER=preambleReceivedTargetPower+DELTA_PREAMBLE+(PREAMBLE_POWER_RAMPING_COUNTER−1)×PREAMBLE_POWER_RAMPING_STEP+delta_fallback_TargetPower.

10. The device according to claim 9, wherein,
the second target received power offset value (delta_fallback_TargetPower) is a preset fixed value, or is linear correlated to a ramping amplitude of the target received power of the preamble of the two-step random access procedure that is not completed.

11. The device according to claim 10, wherein, delta_fallback_TargetPower equals to β×(PREAMBLE_POWER_RAMPING_COUNTER'−1)×PREAMBLE_POWER_RAMPING_STEP';
wherein, the β is a linear correlation factor, the PREAMBLE_POWER_RAMPING_COUNTER' is a power ramping count value of the two-step random access procedure that is not completed, the PREAMBLE_POWER_RAMPING_STEP' is a power ramping step factor of a preamble of the two-step random access procedure.

12. The device according to claim 7, wherein,
an initial value of the power ramping count value (PREAMBLE_POWER_RAMPING_COUNTER) of the four-step random access preamble is:
a preset initial value; or
a preamble power ramping count value of the two-step random access procedure that is not completed.

13. The device according to claim 6, wherein the initiating the four-step random access procedure further comprises:
according to the four-step random access preamble, the uplink transmission resources of the four-step random access preamble and the calculated transmission power of the four-step random access preamble, transmitting the four-step random access preamble when the two-step random access procedure is not completed.

* * * * *